United States Patent
Kanda et al.

(10) Patent No.: US 9,401,939 B2
(45) Date of Patent: Jul. 26, 2016

(54) COMMUNICATION MANAGEMENT SYSTEM, COMMUNICATION METHOD, AND RECORDING MEDIUM STORING COMMUNICATION CONTROL PROGRAM

(71) Applicants: Hiroyuki Kanda, Kanagawa (JP); Takahiro Asai, Kanagawa (JP)

(72) Inventors: Hiroyuki Kanda, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 211 days.

(21) Appl. No.: 14/186,175

(22) Filed: Feb. 21, 2014

(65) Prior Publication Data

US 2014/0244755 A1 Aug. 28, 2014

(30) Foreign Application Priority Data

Feb. 25, 2013 (JP) .................................. 2013-034146
Feb. 10, 2014 (JP) .................................. 2014-023399

(51) Int. Cl.
*H04L 29/06* (2006.01)
*H04M 3/38* (2006.01)
*H04M 3/56* (2006.01)

(52) U.S. Cl.
CPC .......... *H04L 65/403* (2013.01); *H04L 65/1069* (2013.01); *H04L 65/1093* (2013.01); *H04M 3/38* (2013.01); *H04M 3/567* (2013.01)

(58) Field of Classification Search
None
See application file for complete search history.

(56) References Cited

U.S. PATENT DOCUMENTS

| | | | |
|---|---|---|---|
| 2003/0103492 A1* | 6/2003 | Tanimoto | H04L 12/5692 370/351 |
| 2006/0246934 A1 | 11/2006 | Patel et al. | |
| 2008/0192770 A1* | 8/2008 | Burrows | H04L 65/104 370/466 |
| 2009/0316686 A1 | 12/2009 | Mandre | |
| 2009/0327419 A1* | 12/2009 | Serr | G06F 15/16 709/204 |
| 2012/0072505 A1* | 3/2012 | Patil | H04L 12/1822 709/206 |
| 2012/0148037 A1* | 6/2012 | Brunson | H04M 3/2281 379/93.02 |
| 2012/0221702 A1 | 8/2012 | Umehara et al. | |
| 2013/0298031 A1 | 11/2013 | Kanda et al. | |

FOREIGN PATENT DOCUMENTS

| | | |
|---|---|---|
| GB | 2460897 A | 12/2009 |
| JP | 2007-124028 | 5/2007 |
| JP | 2008-227577 | 9/2008 |
| JP | 2012-191598 | 10/2012 |
| JP | 2013-153419 | 8/2013 |

OTHER PUBLICATIONS

U.S. Appl. No. 14/190,587, filed Feb. 26, 2014.
Extended European Search Report issued Jun. 20, 2014 in Patent Application No. 14155697.7.

* cited by examiner

*Primary Examiner* — Kevin Bates
*Assistant Examiner* — Lesa Kennedy
(74) *Attorney, Agent, or Firm* — Oblon, McClelland, Maier & Neustadt, L.L.P.

(57) ABSTRACT

A communication management system, a communication method, and a non-transitory recording medium storing a communication control program, each of which is capable of determining whether to start a communication session with a third communication terminal that requests to participate in a communication session being carried by at least a first communication terminal and a second communication terminal, based on session identification information and location information that are received from the third communication terminal.

8 Claims, 21 Drawing Sheets

FIG. 2
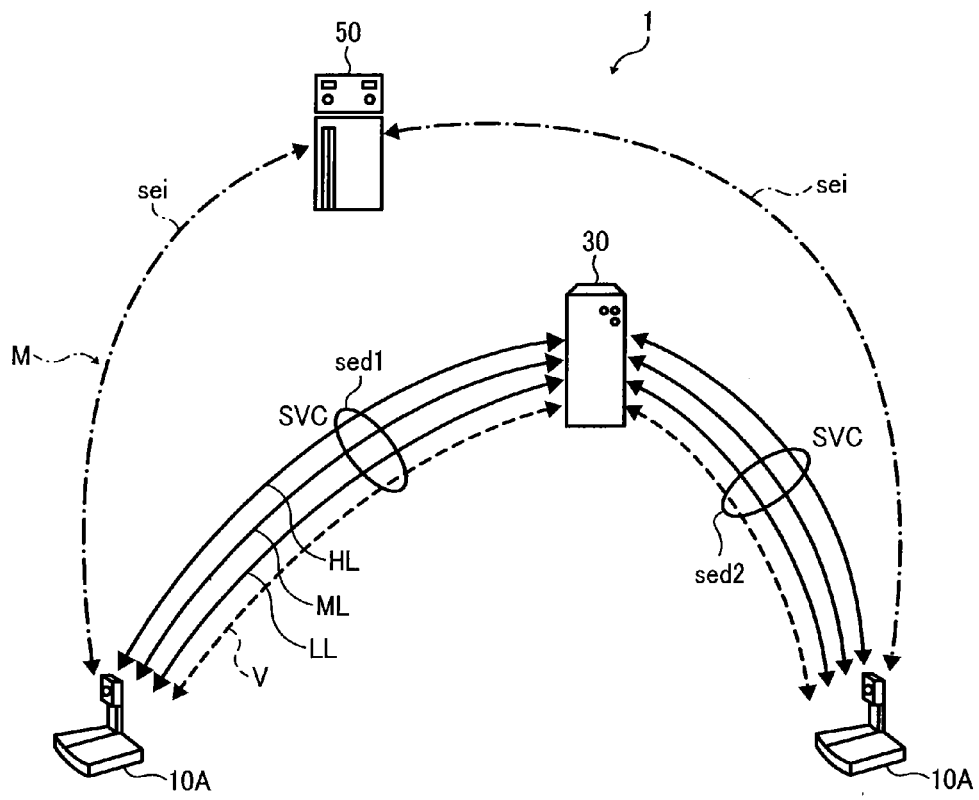
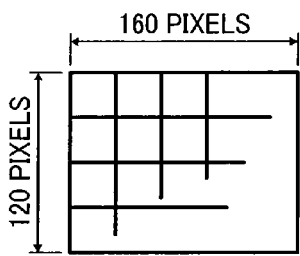
FIG. 3A
160 PIXELS
120 PIXELS
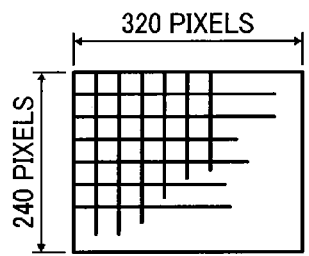
FIG. 3B
320 PIXELS
240 PIXELS
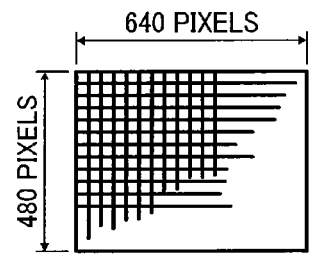
FIG. 3C
640 PIXELS
480 PIXELS

FIG. 10

DATA QUALITY MANAGEMENT TABLE

| TERMINAL IP ADDRESS | IMAGE QUALITY |
|---|---|
| 1.3.1.4 | HIGH |
| 1.3.1.3 | HIGH |
| 1.2.2.3 | MEDIUM |
| ... | ... |

FIG. 11

RELAY DEVICE MANAGEMENT TABLE

| RELAY DEVICE ID | OPERATION STATE | DATE AND TIME RECEIVED | RELAY DEVICE IP ADDRESS | MAXIMUM DATA TRANSMISSION SPEED (Mbps) |
|---|---|---|---|---|
| 111a | ON LINE | 2011.11.10.13:00 | 1.2.1.2 | 100 |
| 111b | ON LINE | 2011.11.10.13:10 | 1.2.2.2 | 1000 |
| 111c | OFF LINE | 2011.11.10.13:20 | 1.3.1.2 | 10 |

FIG. 12

TERMINAL INFORMATION MANAGEMENT TABLE

| TERMINAL ID | PASSWORD | MODEL NUMBER | SERIAL NUMBER | COMMUNICATION PROTOCOL | IP ADDRESS |
|---|---|---|---|---|---|
| 01aa | aaaa | 9001 | 2001 | DEDICATED | |
| 01ab | abab | 9001 | 2002 | DEDICATED | |
| 01ac | acac | 9001 | 2003 | DEDICATED | |
| ... | ... | ... | ... | ... | |
| 01da | dada | 8001 | 1001 | NON-DEDICATED 1 | 1.3.2.3 |
| 01db | dbdb | 8001 | 1002 | NON-DEDICATED 2 | 1.3.2.4 |
| 01dc | dcdc | 8001 | 1003 | NON-DEDICATED 1 | 1.3.2.5 |
| ... | ... | ... | ... | | ... |

FIG. 13

TERMINAL STATE MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ONLINE (COMMUNICATION OK) | 2011.11.10.13:40 | 1.2.1.3 |
| 01ab | JAPAN TOKYO OFFICE AB TERMINAL | OFFLINE | 2011.11.09.12:00 | 1.2.1.4 |
| ... | ... | ... | ... | ... |
| 01ba | JAPAN OSAKA OFFICE BA TERMINAL | ONLINE (INTERRUPT) | 2011.11.10.13:45 | 1.2.2.3 |
| 01bb | JAPAN OSAKA OFFICE BB TERMINAL | ONLINE (COMMUNICATION OK) | 2011.11.10.13:50 | 1.2.2.4 |
| ... | ... | ... | ... | ... |
| 01ca | U.S. NY OFFICE CA TERMINAL | ONLINE (COMMUNICATION OK) | 2011.11.10.12:45 | 1.3.1.3 |
| 01cb | U.S. NY OFFICE CB TERMINAL | ONLINE (COMMUNICATING) | 2011.11.10.13:55 | 1.3.1.4 |
| ... | ... | ... | ... | ... |
| 01da | U.S. WASH, D.C. OFFICE DA TERMINAL | | | |
| 01db | U.S. WASH, D.C. OFFICE DB TERMINAL | | | |
| ... | ... | | | |

FIG. 14

CANDIDATE LIST MANAGEMENT TABLE

| REQUEST TERMINAL ID | COUNTERPART TERMINAL ID |
|---|---|
| 01aa | 01ab,···,01ba,01bb,···,01ca,01cb,01da,01db |
| ... | ... |
| 01ba | 01aa,01ab,01ca,01cb,01da,01db |
| ... | ... |
| 01ca | 01aa,01ab,01ba,···,01da |
| 01da | 01aa,··· |
| ... | ... |

FIG. 15

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se01 | 111a | 01aa | 01ca | 200 | 2011.11.10.14:00 |
| se02 | 111b | 01ba | 01cb | 50 | 2011.11.10.14:10 |
| se03 | 111c | 01bb | 01cc | 400 | 2011.11.10.14:20 |
| ... | ... | ... | ... | ... | ... |

FIG. 16

CONVERSION MANAGEMENT TABLE

| NON-DEDICATED TERMINAL TERMINAL ID | CONVERSION SYSTEM IP ADDRESS | NON-DEDICATED TERMINAL IP ADDRESS |
|---|---|---|
| 01da | 1.3.2.2 | 1.3.2.3 |
| 01db | 1.3.2.2 | 1.3.2.4 |
| 01dc | 1.3.2.2 | 1.3.2.5 |
| ... | ... | ... |

FIG. 17

QUALITY MANAGEMENT TABLE

| DELAY TIME (ms) | IMAGE QUALITY |
|---|---|
| 0 - 100 | HIGH |
| 100 - 300 | MEDIUM |
| 300 - 500 | LOW |
| 500 - | (INTERRUPT) |

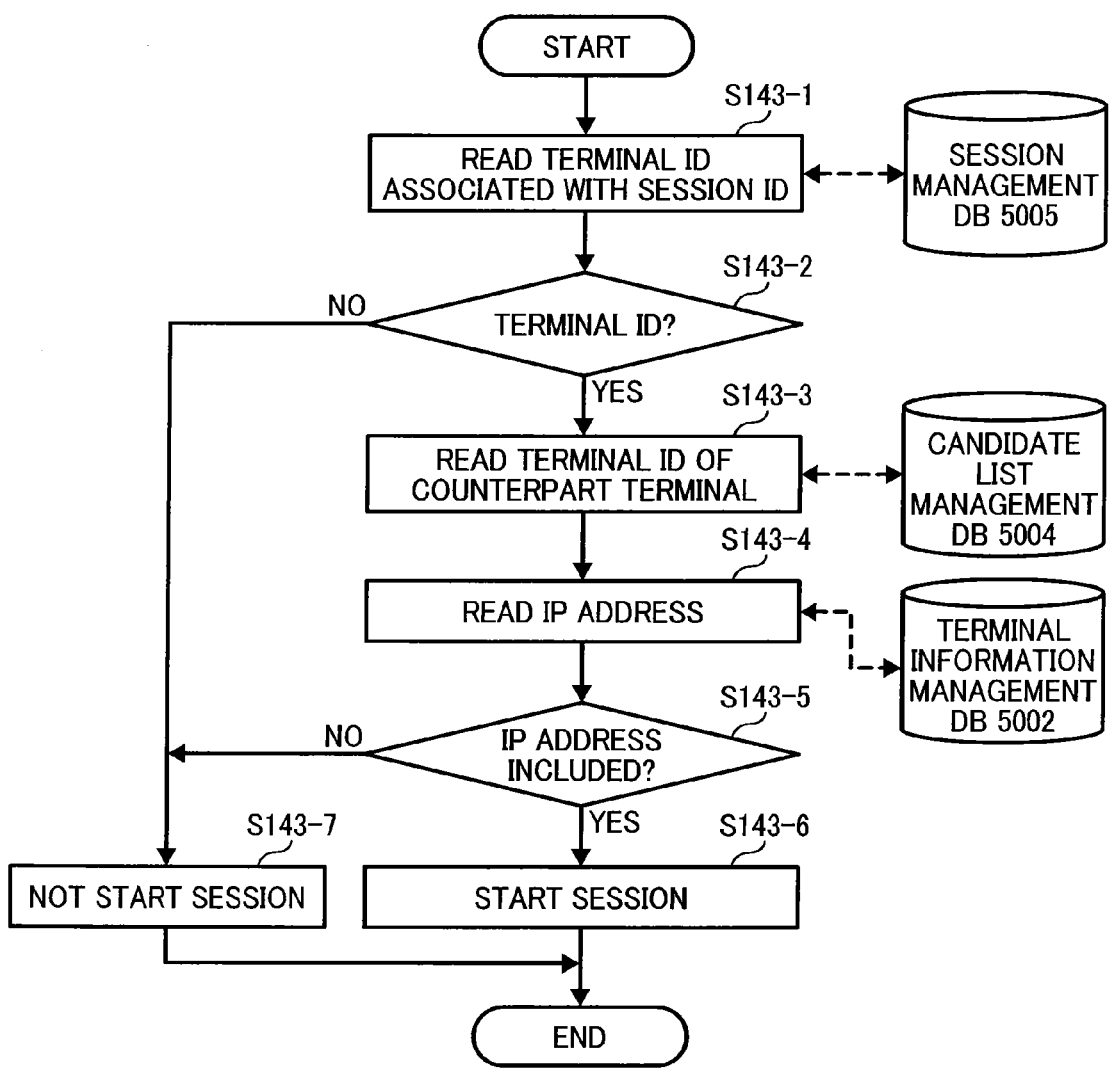

COMMUNICATION MANAGEMENT SYSTEM, COMMUNICATION METHOD, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application Nos. 2013-034146, filed on Feb. 25, 2013, and 2014-023399, filed on Feb. 10, 2014, in the Japan Patent Office, the entire disclosure of which is hereby incorporated by reference herein.

BACKGROUND

1. Technical Field

The present invention generally relates to managing a communication terminal that transmits or receives image data.

2. Description of the Related Art

With the need for reducing costs or times associated with business trips, communication systems provided with teleconference or videoconference ("conference") capabilities are widely used. The communication systems allow transmission of contents data such as image data and/or sound data among a plurality of communication terminals that are remotely located from one another to facilitate communication among the plurality of communication terminals through a communications network such as the Internet.

While communicating among the plurality of communication terminals, a communication terminal other than the communication terminals that are participating in communication may request to participate in communication.

SUMMARY

Example embodiments of the present invention include a communication management system, a communication method, and a non-transitory recording medium storing a communication control program, each of which is capable of determining whether to start a communication session with a third communication terminal that requests to participate in a communication session being carried by at least a first communication terminal and a second communication terminal, based on session identification information and location information that are received from the third communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is an illustration for explaining communication between or among a plurality of communication terminals using the same communications protocol;

FIGS. 3A to 3C are illustrations for explaining image quality of image data transmitted or received by the communication system of FIG. 1, according to the SVC standards;

FIG. 10 is an example data structure of an image quality management table, managed by the management system of FIG. 9;

FIG. 11 is an example data structure of a relay device management table, managed by the management system of FIG. 9;

FIG. 12 is an example data structure of a terminal management table, managed by the management system of FIG. 9;

FIG. 13 is an example data structure of a terminal state management table, managed by the management system of FIG. 9;

FIG. 14 is an example data structure of a candidate list management table, managed by the management system of FIG. 9;

FIG. 15 is an example data structure of a session management table, managed by the management system of FIG. 9;

FIG. 16 is an example data structure of a conversion management table, managed by the management system of FIG. 9;

FIG. 17 is an example data structure of a data quality management table, managed by the management system of FIG. 9;

FIG. 27 is a flowchart illustrating operation of determining whether to allow starting of the communication session, performed by the management system, according to an example embodiment of the present invention.

Figure 1:
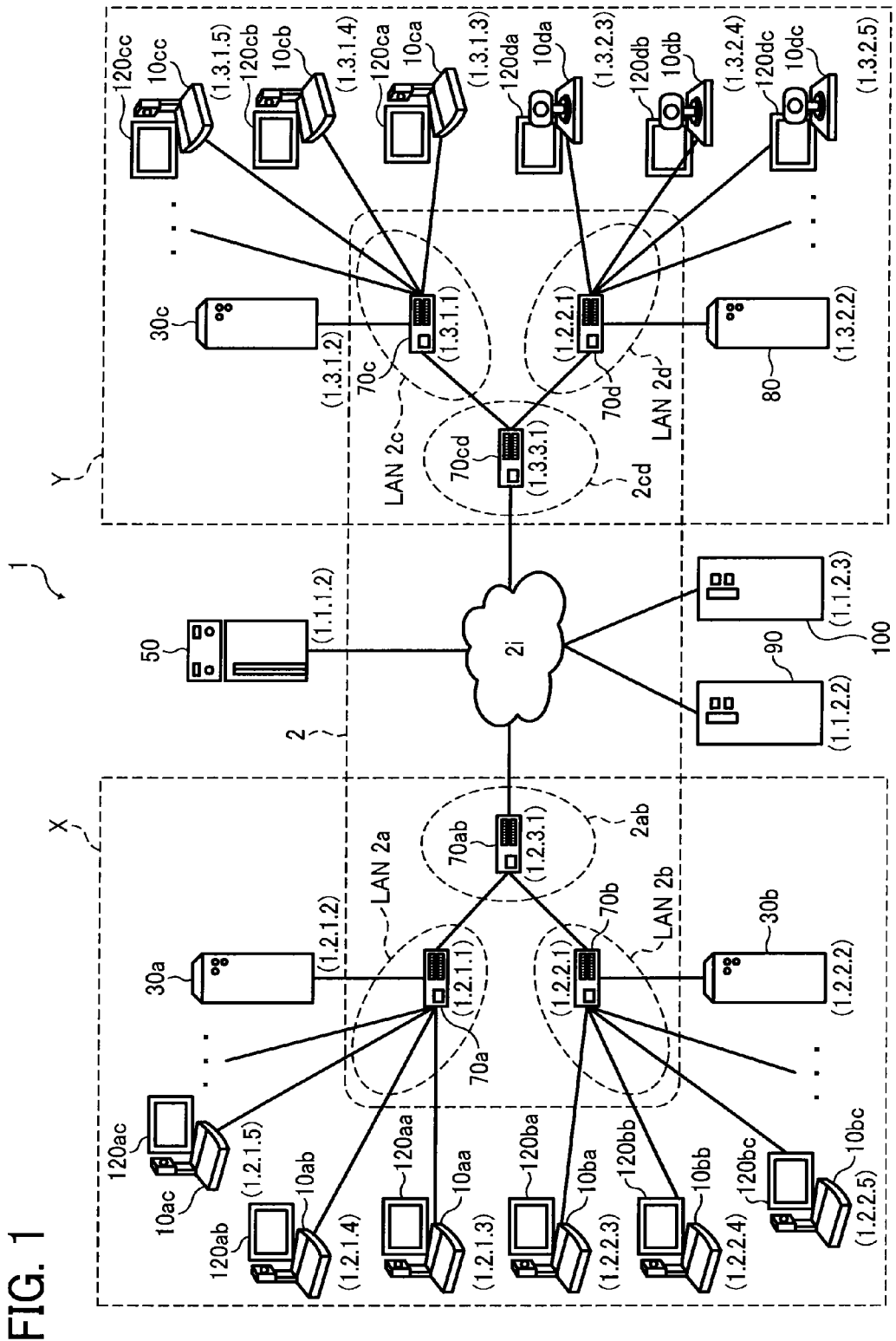
FIG. 1 is a schematic block diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to FIGS. 1 to 27, an example embodiment of the present invention is described.

<Configuration>

FIG. 1 illustrates a configuration of a communication system 1 according to an example embodiment of the present invention. The communication system 1 of FIG. 1 includes a plurality of communication terminals 10*aa*, 10*ab*, 10*ac*, 10*ba*, 10*bb*, 10*bc*, 10*ca*, 10*cb*, 10*cc*, 10*da*, 10*db*, and 10*dc*, and a plurality of displays 120*aa*, 120*ab*, 120*ac*, 120*ba*, 120*bb*, 120*bc*, 120*ca*, 120*cb*, 120*cc*, 120*da*, 120*db*, and 120*dc*, a plurality of relay devices 30*a*, 30*b*, and 30*c*, a communication management system 50, a conversion system 80, a program providing system 90, and a maintenance system 100. In the following examples, the communication system 1 is implemented as a videoconference system that allows at least two of the plurality of communication terminals 10 to remotely communicate with one another. More specifically, the communication system 1 allows transmission of contents data, such as image data and sound data, between or among at least two of the plurality of communication terminals 10. The communication system 1 further includes a plurality of routers 70*a*, 70*b*, 70*c*, 70*d*, 70*ab*, and 70*cd*, which may be collectively or each referred to as the router 70. The router 70 selects a route that is most suitable for transmitting contents data such as image data and sound data.

Still referring to FIG. 1, the terminals 10*aa*, 10*ab*, and 10*ac*, the relay device 30*a*, and the router 70*a* are connected to a local area network (LAN) 2*a*. The terminals 10*ba*, 10*bb*, and 10*bc*, the relay device 30*b*, and the router 70*b* are connected to a LAN 2*b*. The LAN 2*a* and the LAN 2*b* are connected to a leased line 2*ab* in which the router 70*ab* is provided. It is assumed that the LAN 2*a*, LAN 2*b*, and the leased line 2*ab*, are located in an area X. For example, assuming that the area X is any area in Japan, the LAN 2*a* could be located within an office in a city such as Tokyo, and the LAN 2*b* could be located within an office in another city such as Osaka.

The terminals 10*ca*, 10*cb*, and 10*cc*, the relay device 30*c*, and the router 70*c* are connected to a LAN 2*c*. The terminals 10*da*, 10*db*, and 10*dc*, the relay device 30*d*, and the router 70*d* are connected to a LAN 2*d*. The LAN 2*c* and the LAN 2*d* are connected to a leased line 2*cd* in which the router 70*cd* is provided. It is assumed that the LAN 2*c*, LAN 2*d*, and leased line 2*cd* are located in an area Y apart from the area X. For example, assuming that the area is any area in the United States, the LAN 2*c* could be located within an office in a city such as New York, and the LAN 2*d* could be located within an office in another city such as Washington, D.C. The area X and the area Y are connected through the Internet 2*i*, via the routers 70*ab* and 70*cd*.

For the descriptive purposes, in this example, any number of the plurality of communication terminals 10*aa* to 10*dc* may be collectively or each referred to as the terminal 10. Any number of the plurality of displays 120*aa* to 120*dc* may be collectively or each referred to as the display 120. Any number of the plurality of relay devices 30*a*, 30*b*, and 30*c* may be collectively or each referred to as the relay device 30. The communication management system 50 may be referred to as the "management system" 50.

The terminal 10 that transmits data to another terminal 10 to carry out videoconference is referred to as the request terminal 10. The terminal 10 that receives data from another terminal 10 to carry out videoconference is referred to as the counterpart terminal 10. For example, the request terminal 10 includes any terminal 10 that requests another terminal 10 to start videoconference, and the counterpart terminal 10 includes any terminal 10 that is requested by the request terminal 10 to start videoconference.

The management system 50, the program providing system 90, and the maintenance system 100 are connected through the Internet 2i to the terminal 10 and the relay device 30. In this example, the conversion system 80 is connected to the router 70d on the LAN 2d, located in the area Y. Any one of the management system 50, the program providing system 90, and the maintenance system 100 may be located at any location within or outside any one of the area X and the area Y.

In this example, the communications network 2 includes the LAN 2a, LAN 2b, leased line 2ab, Internet 2i, leased line 2cd, LAN 2c, and LAN 2d. Any one or any portion of these lines or any other lines that may be included in the communications network 2 may be implemented as wired network or wireless network such as Wireless Fidelity (WiFi) network or Bluetooth network.

As shown in FIG. 1, the terminal 10, the relay device 30, the management system 50, the router 70, the conversion system 80, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

The communication terminal 10 of FIG. 1 allows a user to communicate with another user at the counterpart communication terminal 10, by transmitting or receiving contents data such as image data and sound data. For example, any terminal that may be used for videoconference may be used. Further, the terminal 10 transmits or receives contents data to or from the counterpart terminal 10 using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

Further, in this example, any one of the communication terminal 10 that communicates data using a predetermined communications protocol, is referred to as a dedicated terminal 10A. In one example, the dedicated terminal 10A uses the (4) IM protocol or the (7) extended IM based protocol as a call control protocol, and the Scalable Video Coding (SVC) as an encoding format. The SVC is the Annex G extension of the AGC.

Further, any one of the communication terminal 10 that communicates data using a communications protocol other than the predetermined communications protocol of the dedicated terminal 10A, is referred to as a non-dedicated terminal 10D. In this example, when the communication terminal 10 uses a call control protocol other than the (4) IM protocol or the (7) extended IM based protocol, and/or an encoding format other than the SVC, it is determined that the communication terminal 10 is the non-dedicated terminal 10D.

In one example, whether the terminal 10 is the dedicated terminal 10A or the non-dedicated terminal 10D may depend on a specific organization that manufactures, sells, or manages the terminal 10, as the communications protocol may be determined based on a communications network or system in use by the specific organization. The dedicated terminal 10A is defined as a communication terminal that is manufactured, sold, or managed by a specific organization such as a specific company. The non-dedicated terminal 10D is defined as a communication terminal that is manufactured, sold, or managed by an organization other than the specific organization.

In another example, whether the terminal 10 is the dedicated terminal 10A or the non-dedicated terminal 10D may depend on time when the terminal 10 is manufactured, or time when the terminal 10 is sold such as when it is released to the market. The dedicated terminal 10A may be defined as a communication terminal that is manufactured or sold by a specific organization, after the time when the non-dedicated terminal 10D is manufactured or sold by the specific organization. For example, even though the dedicated terminal 10A and the non-dedicated terminal 10D are both manufactured, sold, or managed by the same organization, the dedicated terminal 10A may be a new model such that it communicates using a different communications protocol than the communications protocol of the non-dedicated terminal 10D.

The relay device 30 is a computer system, which may be implemented by one or more computers, to relay contents data between or among the terminals 10. The management system 50 is a computer system, which may be implemented by one or more computers, to centrally manage various information such as login information of the terminal 10, the communication state of the terminal 10, candidate list information, and the communication state of the relay device 30. In this example, a moving image, a still image, or both of the still image and the moving image, may be transmitted as the image data.

The conversion system 80 functions as a signaling gateway that converts a call control signal as well as a video/audio gateway that encodes the contents data. More specifically, the conversion system 80 converts a communications protocol of the contents data that is transmitted from one terminal 10, to a communications protocol compatible with the other counterpart terminal 10. The conversion system 80 at least converts a call control protocol or an encoding format of the contents data so that the contents data is compatible with the terminal 10 to which the contents data is sent.

The program providing system 90 is a computer system, which may be implemented by one or more computers, to provide programs to the terminal 10, the relay device 30, the management system 50, the conversion system 80, and the maintenance system 100, respectively, through the communications network 2.

The maintenance system 100 is a computer system, which may be implemented by one or more computers, to maintain, manage, fix, or upgrade at least one of the terminal 10, relay device 30, management system 50, conversion system 80, program providing system 90. Assuming that the maintenance system 100 is provided within a country, and the terminal 10, relay device 30, management system 50, conversion system 80, and program providing system 90 are each installed outside the country, the maintenance system 100 maintains, manages, fixes, or upgrades at least one of the terminal 10, relay device 30, management system 50, conversion system 80, and program providing system 90, remotely through the communications network 2. The maintenance system 100 may manage maintenance of at least one of the terminal 10, relay device 30, management system 50, conversion system 80, and program providing system 90 without using the communications network 2. For example, a machine type number, a manufacturing number, customer information, maintenance and repair information, and failure log information may be maintained at the maintenance system 100 without using the communications network 2.

Referring now to FIGS. 2 and 3A to 3C, a first communications pattern in which contents data are transmitted between two dedicated terminals 10A is explained according to an example embodiment of the present invention. FIG. 2 illustrates a communication state in which the communication terminals 10 communicate with each other using the same communications protocol.

As illustrated in FIG. 2, in the first communications pattern, the communication terminals 10 in the communication system 1 communicate with each other in compliance with the H.264/SVC video coding standards. More specifically, in the communication system 1, the request terminal 10 and the counterpart terminal 10 each of which is implemented as the dedicated terminal 10A establish a management data communication session "sei" through the management system 50 to transmit or receive various management data "M". The request terminal 10 and the counterpart terminal 10 further establish four contents data communication sessions including a session "HL" to transmit high-level resolution image data, a session "ML" to transmit medium-level resolution image data, a session "LL" to transmit low-level resolution image data, and a session "V" to transmit sound data, through the relay device 30.

Referring to FIG. 2, the above-described four contents data communication sessions established between the request terminal 10 and the relay device 30 to transmit contents data are collectively referred to as a first communication session "sed1". The above-described four contents data communication sessions established between the counterpart terminal 10 and the relay device 30 to transmit contents data are collectively referred to as a second communication session "sed2".

Referring now to FIGS. 3A to 3C, resolution of image data to be transmitted or received according to the first communications pattern of FIG. 2, in compliance with the SVC standards, is explained in more detail.

As illustrated in FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Figure 4:
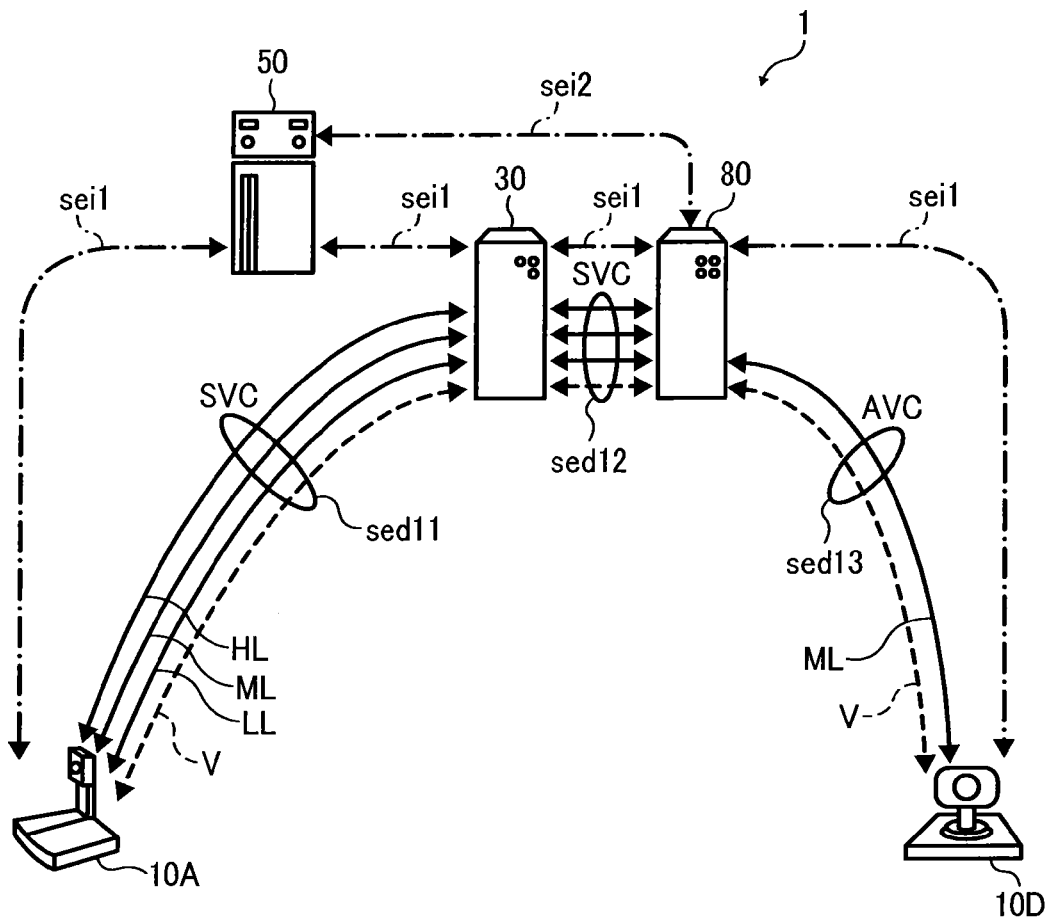
FIG. 4 is an illustration for explaining communication between or among a plurality of communication terminals using different communications protocols.
Figure 5:
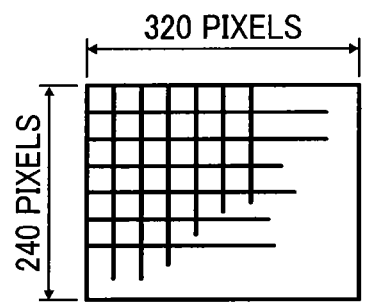
FIG. 5 is an illustration for explaining image quality of image data transmitted or received by the communication system of FIG. 1, according to the AVC standards.

Referring now to FIGS. 4 and 5, a second communications pattern in which contents data are transmitted between the dedicated terminal 10A and the non-dedicated terminal 10D is explained according to an example embodiment of the present invention. FIG. 4 illustrates a communication state in which the communication terminals 10 communicate with each other using different communications protocols.

As illustrated in FIG. 4, in the second communications pattern, one communication terminal 10 in the communication system 1 communicates in compliance with the H.264/SVC video coding standards, and the other communication terminal 10 in the communication system 1 communicates in compliance with the H.264/advanced video coding (AVC) video coding standards. More specifically, in the communication system 1, the request terminal 10 that is implemented as the dedicated terminal 10A, and the counterpart terminal 10 that is implemented as the non-dedicated terminal 10D, establish a management data communication session "sei1" through the management system 50 to transmit or receive various management data "M". More specifically, in this example, the management data communication session "sei1" is established between the dedicated terminal 10A and the non-dedicated terminal 10D through the management system 50, via the relay device 30 and the conversion system 80. The management system 50 and the conversion system 80 establish a management data communication session "sei2" to transmit or receive various management data.

The request terminal 10A and the conversion system 80 establish four contents data communication sessions including a session "HL" to transmit high-level resolution image data, a session "ML" to transmit medium-level resolution image data, a session "LL" to transmit low-level resolution image data, and a session "V" to transmit sound data, through the relay device 30, based on the H.264/SVC standards. In FIG. 4, the above-described four contents data communication sessions established between the request terminal 10A and the relay device 30 to transmit contents data are collectively referred to as a first communication session "sed11". The above-described four contents data communication sessions established between the conversion system 80 and the relay device 30 to transmit contents data are collectively referred to as a second communication session "sed12".

The conversion system 80 and the counterpart terminal 10D establish two contents data communication sessions including a session "ML" to transmit medium-level resolution image data, and a session "V" to transmit sound data, through the relay device 30, based on the H.264/AVC standards. In FIG. 4, the above-described two contents data communication sessions established between the conversion system 80 and the counterpart terminal 10D to transmit contents data are collectively referred to as a third communication session "sed13".

Referring now to FIGS. 3A to 3C and 5, resolution of image data to be transmitted or received according to the second communications pattern of FIG. 4, in compliance with the AVC standards, is explained in more detail.

In the first communication session "sed11" and the second communication session "sed12" of FIG. 4, the low-level resolution image data of FIG. 3A, the medium-level resolution image data of FIG. 3B, and the high-level resolution image data of FIG. 3C may be transmitted or received, as described above referring to the example case of FIG. 2. In the third communication session "sed13" of FIG. 4, the medium-level resolution image data of FIG. 5 is transmitted or received. The medium-level resolution image data of FIG. 5 is substantially similar to the medium-level resolution image data of FIG. 3B. Any one of the above-described types of image data may be transmitted together with sound data such as voice data.

<Hardware Structure of Communication System>

Figure 6:
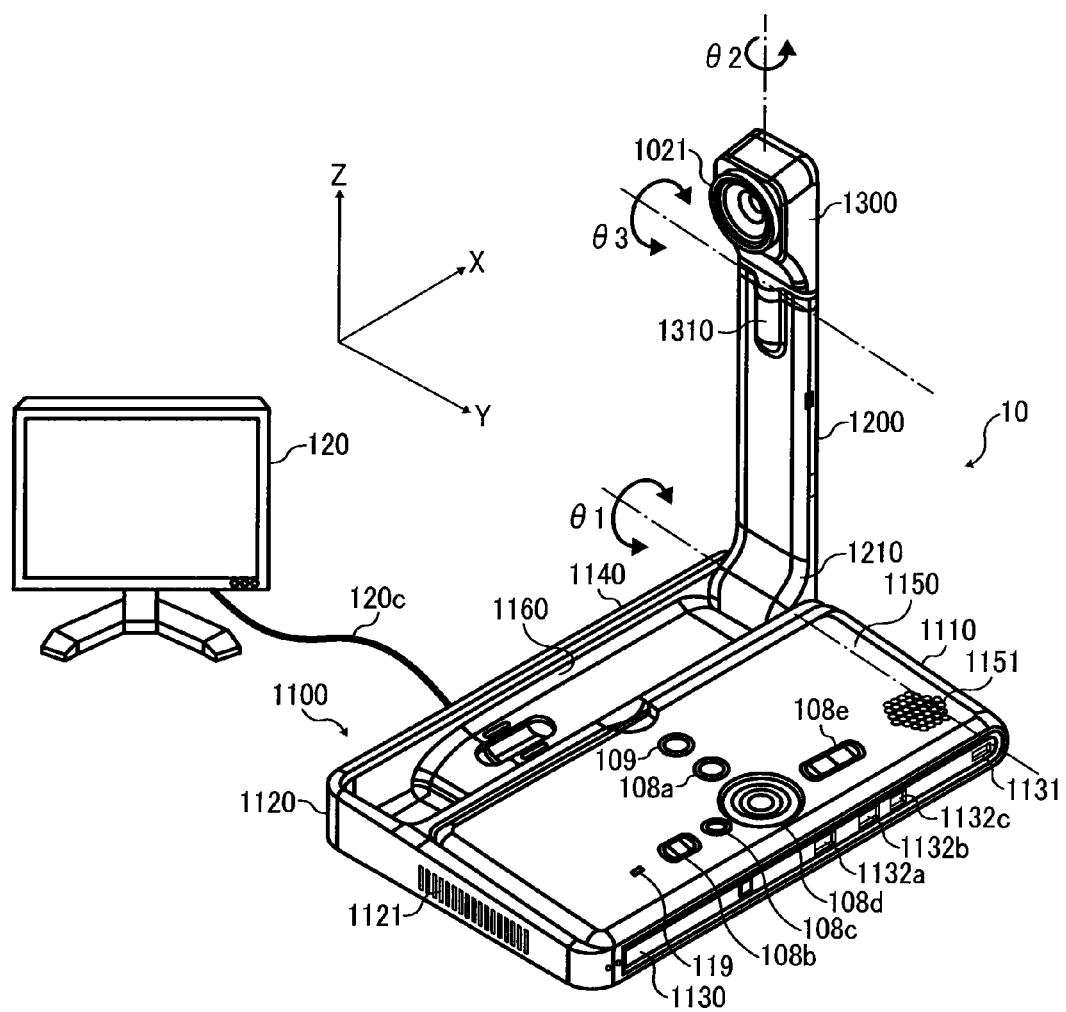
FIG. 6 is a perspective view illustrating the outer appearance of a communication terminal of the communication system of FIG. 1.

FIG. 6 is a perspective view illustrating the outer appearance of the communication terminal 10 of the communication system 1 of FIG. 1. As illustrated in FIG. 6, the terminal 10 includes a body 1100, an arm 1200, and a camera housing 1300. The body 1100 includes a front side wall 1110 having a plurality of air intake holes that are formed over the nearly entire surface of the intake surface of the front side wall 1110. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 7) of the terminal 10 is able to catch sounds such as human voice or any sound including noise.

Figure 7:
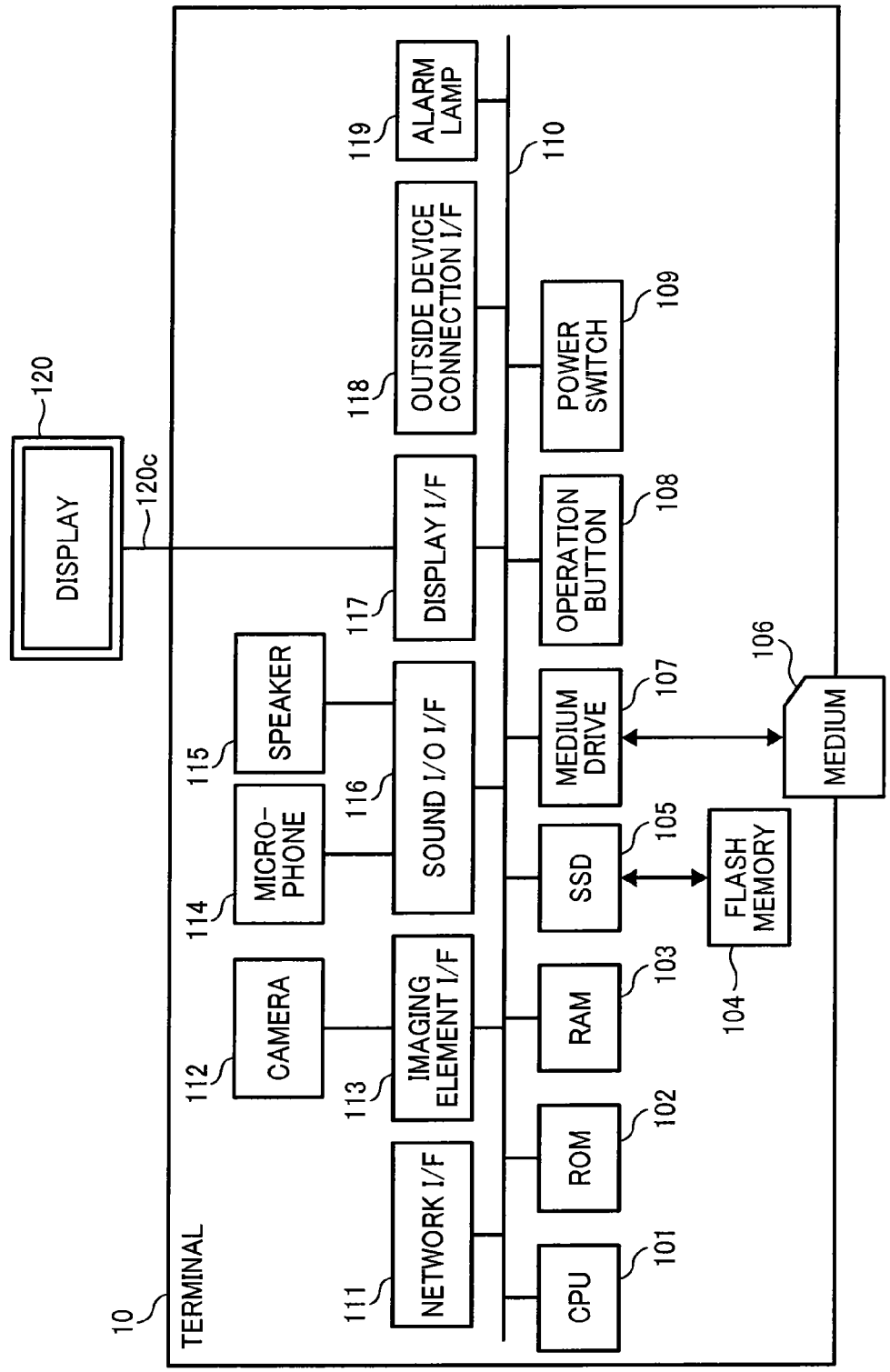
FIG. 7 is a schematic block diagram illustrating a hardware structure of the communication terminal of FIG. 6.

The body 1100 has an operation panel 1150, which is provided at a front surface toward the right side wall 1130. The operation panel 1150 includes a plurality of operation keys 108a to 108e ("the operation key 108"), a power switch 109, an alarm lamp 119, and a plurality of sound output holes 1151. Through the sound output holes 1151, a speaker 115 (FIG. 7) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 7). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 6 illustrates the case where the tilt angle θ1 is 90 degrees.

The camera housing 1300 incorporates therein the camera 112 (FIG. 7) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 6, the pan angle θ2 and the tilt angle θ3 are each 0 degree.

The relay device 30, the management system 50, the conversion system 80, the program providing system 90, and the maintenance system 100 are each implemented by any desired number of general-purpose computers such as a personal computer or a server computer. For simplicity, explanation of the outer appearance of the computer is omitted.

FIG. 7 is a schematic block diagram illustrating a hardware structure of the communication terminal 10. As illustrated in FIG. 7, the terminal 10 includes a central processing unit (CPU) 101, a read only memory (ROM) 102, a random access memory (RAM) 103, a flash memory 104, a solid state drive (SSD) 105, a medium drive 107, the operation key 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 6 and 7, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 6). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 8:
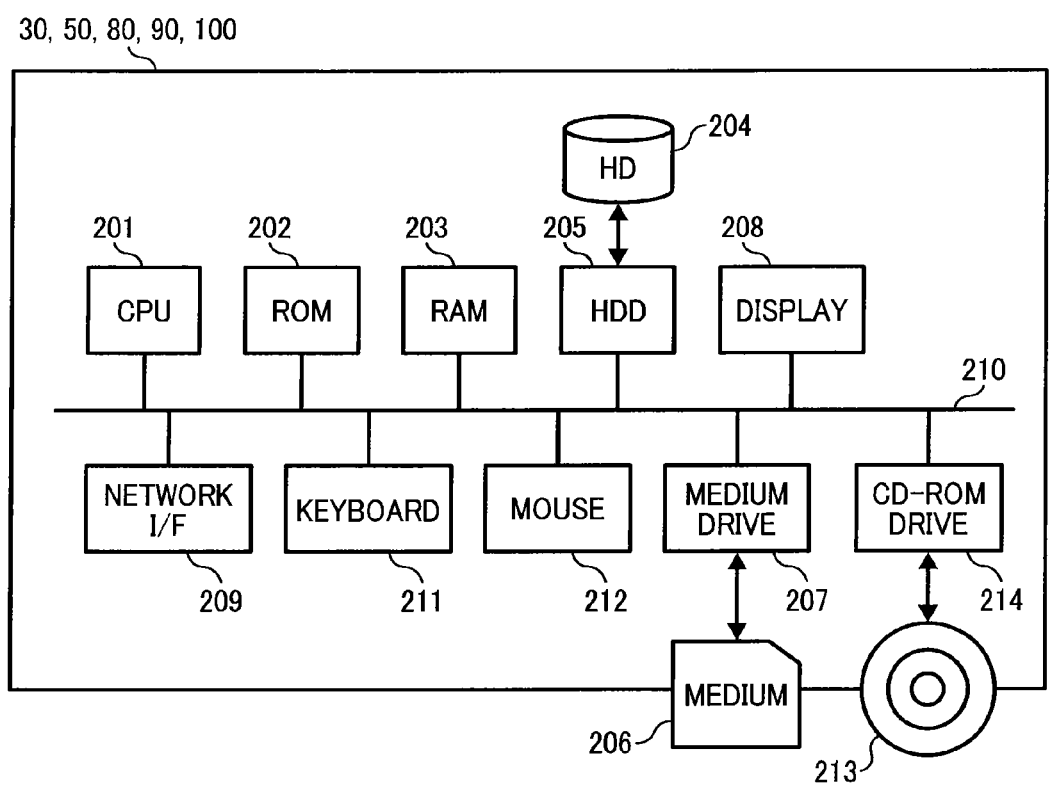
FIG. 8 is a schematic block diagram illustrating a hardware structure of any one of the communication management system, relay device, conversion system, program providing system, and maintenance system of the communication system of FIG. 1.

FIG. 8 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay device 30 is substantially similar in hardware structure to the management system 50 of FIG. 8, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The conversion system 80 is substantially similar in hardware structure to the management system 50 of FIG. 8, except for replacement of the management program with a conversion control program that is used for controlling the conversion system 80. The conversion control program may be written onto a recording medium that is readable by a general-purpose computer such as the recording medium 206 or the CD-ROM 213 in any format that is installable or executable by the general-purpose computer. Once the conversion control program is written onto the recording medium, the recording medium may be distributed. Further, the conversion control program may be stored in any desired memory other than the HD 204, such as the ROM 202.

The program providing system 90 is substantially similar in hardware structure to the management system 50 of FIG. 8, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 8, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Communication System>

Figure 9:
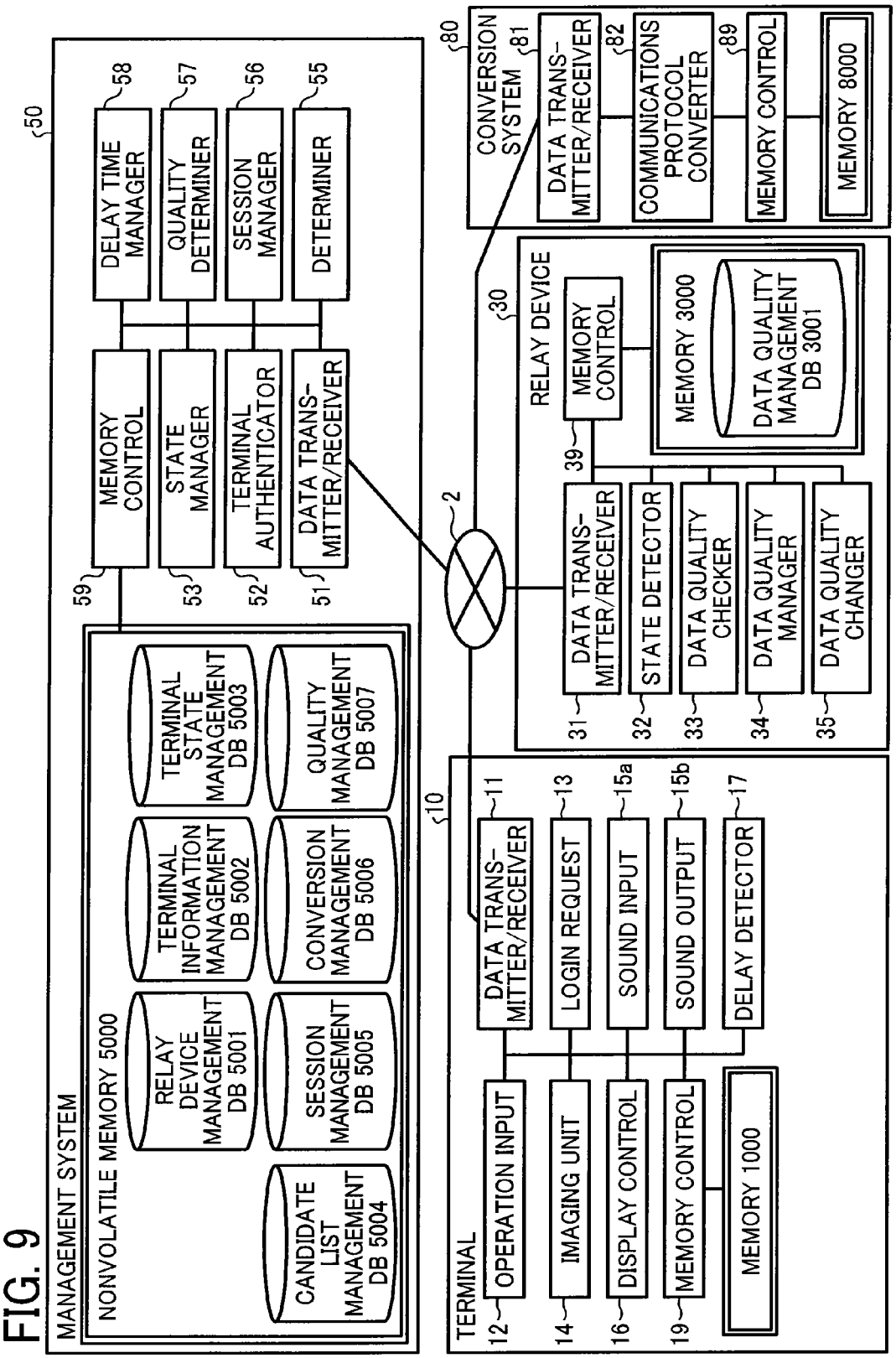
FIG. 9 is a schematic block diagram illustrating a functional structure of the communication terminal, relay device, communication management system, and conversion system of the communication system of FIG. 1.

Next, a functional structure of the communication system of FIG. 1 is explained according to an example embodiment of the present invention. FIG. 9 is a schematic block diagram illustrating functional structure of the communication system 1. As illustrated in FIG. 9, the terminal 10, the relay device 30, the management system 50, and the conversion system 80 exchange data with one another through the communications network 2. In FIG. 9, the program providing system 90 and the maintenance system 100 of FIG. 1 are omitted.

<Functional Structure of Terminal>

The terminal 10 includes a data transmitter/receiver 11, an operation input 12, a login request 13, an imaging unit 14, a sound input 15a, a sound output 15b, a display control 16, a delay detector 17, and a memory control 19. These units shown in FIG. 9 correspond to a plurality of functions or functional modules, which are executed according to an instruction of the CPU 101 (FIG. 7) that is generated according to the terminal control program being loaded from the flash memory 104 onto the RAM 103. The terminal 10 further includes a memory 1000 that may be implemented by the flash memory 104 and the RAM 103 of FIG. 7.

Referring now to FIGS. 7 and 9, a functional structure of the terminal 10 is explained according to an example embodiment of the present invention. More specifically, in this example, the operations or functions that are performed by the terminal 10, which include the operations or functions performed by the units shown in FIG. 9, are performed in cooperation with one or more hardware devices of the terminal 10 that are shown in FIG. 7.

The data transmitter/receiver 11, which may be implemented by the network I/F 111 (FIG. 7) under control of the CPU 101, transmits or receives various data or information to or from another terminal, device, or system, through the communications network 2. In this example, the data transmitter/receiver 11 starts receiving the operation state information that indicates the operation state of each candidate counterpart terminal 10 from the management system 50, before starting communication with any counterpart terminal 10. The operation state of the candidate terminal 10 indicates whether the candidate terminal 10 is online or offline. When the terminal 10 is online, the operation state of the candidate terminal 10 further indicates whether the candidate terminal 10 is available for communication ("communication OK"), the candidate terminal 10 is having communication with the other terminal ("communicating"), the candidate terminal 10 is not available as the user leaves the seat, or the candidate terminal 10 is having communication but interrupted ("communication, interrupted"). The operation state of the candidate terminal 10 may further indicate whether the candidate terminal 10 is online but in trouble or error ("online, communicating, trouble"), the candidate terminal 10 is online but not capable of outputting image data such that only sound data is output, or the candidate terminal 10 is online but in mute state ("online, mute") such that sound data is not output. For example, when the cable 120c is disconnected from the terminal 10, the operation state of the candidate terminal 10 is assumed to be in the trouble state. For the descriptive purposes, in the following examples, it is assumed that the operation state information indicates whether the candidate terminal 10 is online or offline, and if online, whether the candidate terminal 10 is available for communication, for example, as described above referring to FIG. 10.

The operation input 12 receives a user instruction input by the user through the operation key 108 or the power switch 109 (FIG. 7), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 7). When the power of the terminal 10 is turned on, the login request 13 automatically causes the data transmitter/receiver 11 to send login request information that requests the login process, and a current IP address of the terminal 10, to the management system 50 through the communications network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging unit 14 of the terminal 10 are performed by the camera 112 and the imaging element I/F 113 according to an instruction received from the CPU 101 (FIG. 7). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 of FIG. 9 are performed by the display I/F 117 according to an instruction received from the CPU 101 (FIG. 7). The display control 16 controls transmit of image data, which is generated based on image data of different resolutions, to the display 120. The display control 16 further causes the display 120 that is provided for the request terminal 10 to display a candidate list before the request terminal 10 starts videoconference with a desired counterpart terminal 10.

The delay detector 17 detects a delay time ms indicating a time period in which contents data such as image data or sound data sent through the relay device 30 from another terminal 10 is delayed, according to an instruction received from the CPU 101 (FIG. 7).

The memory control 19 is implemented by the SSD 105 of FIG. 7 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Relay Device>

Now, a functional structure of the relay device 30 is explained. The relay device 30 includes a data transmitter/receiver 31, a state detector 32, a data quality checker 33, a data quality manager 34, a data quality changer 35, and a memory control 39. These units shown in FIG. 9 correspond to a plurality of functions or functional modules, which are executed according to an instruction of the CPU 201 (FIG. 8) that is generated according to the relay device control program being loaded from the HD 204 onto the RAM 203. The relay device 30 further includes a memory 3000 that may be implemented by the RAM 203 and/or the HD 204 (FIG. 8).

(Data Quality Management Table)

The memory 3000 includes a data quality management database (DB) 3001, which stores a data quality management table illustrated in FIG. 10. The data quality management table of FIG. 10 stores an Internet protocol (IP) address of the counterpart terminal 10 to which image data is transmitted through the relay device 30, in association with quality of image data to be transmitted through the relay device 30 to the counterpart terminal 10.

(Functional Structure of Relay Device)

Next, a functional structure of the relay device 30 is explained according to an example embodiment of the present invention. More specifically, in this example, the operations or functions that are performed by the relay device 30, which include the operations or functions performed by the units shown in FIG. 9, are performed in cooperation with one or more hardware devices of the relay device 30 that are shown in FIG. 8.

The data transmitter/receiver 31, which may be implemented by the network I/F 209 (FIG. 8), transmits or receives various data or information to or from another terminal, device, or system, through the communications network 2, under control of instructions received from the CPU 201. Further, the data transmitter/receiver 31 initializes a communication session for the relay device 30.

More specifically, the data transmitter/receiver 31 transmits session start request information, which instructs to start a communication session (the first communication session), to the terminal 10 having the IP address that is received at the data transmitter/receiver 31. The data transmitter/receiver 31 transmits session start request information, which instructs to start a communication session (the second communication session), to the conversion system 80 having the IP address that is received at the data transmitter/receiver 31. The data transmitter/receiver 31 further transmits the IP address of the counterpart terminal 10 to the conversion system 80.

The state detector 32, which is implemented by the CPU 201 of FIG. 8, detects an operation state of the relay device 30. For example, the operation state includes the online state ("online"), the offline state ("offline"), the communicating state ("communicating"), and the interrupted state ("interrupted"). The online state is a state in which the relay terminal 30 is turned on and available for data transmission/reception. The offline state is a state in which the relay terminal 30 is not available for data transmission/reception, for example, as the power is not turned on.

The data quality checker 33, which is implemented by the CPU 201 of FIG. 8, searches the data quality management DB 3001 (FIG. 10) using the IP address of the counterpart terminal 10 as a search key to extract information regarding the quality of image data suitable to communication with the counterpart terminal 10. Based on the extracted information regarding the quality of image data, the relay device 30 determines the quality of image data to be transmitted to the counterpart terminal 10.

The data quality manager 34, which may be implemented by the CPU 201 of FIG. 8, changes the contents of the data quality management DB 3001 based on the quality information that is received from the management system 50. For example, assuming that the request terminal 10aa having the terminal ID "01aa" communicates with the counterpart terminal 10ba having the terminal ID "01ba" to transmit or receive high quality image data during videoconference, transmission of image data may delay for various reasons. For example, if a request terminal 10bb and a counterpart terminal 10ca start videoconference over the communications network 2, transmission of image data from the request terminal 10aa to the counterpart terminal 10ba tends to slow down due to the increase in traffic. In such case, the relay device 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 8, changes the quality of image data received from the request terminal 10 to the quality of image data according to the contents of the data quality management DB 3001.

The memory control 39 is implemented by the HDD 205 of FIG. 8 according to an instruction received from the CPU 201. The memory control 39 stores various data in the memory 3000, or reads out various data from the memory 3000.

<Functional Structure of Management System>

The management system 50 includes a data transmitter/receiver 51, a terminal authenticator 52, a state manager 53, a determiner 55, a session manager 56, a quality determiner 57, a delay time manager 58, and a memory control 59. These units shown in FIG. 9 correspond to a plurality of functions or functional modules, which are executed according to an instruction of the CPU 201 (FIG. 8) that is generated according to the transmission management program being loaded from the HD 204 onto the RAM 203. The management system 50 further includes a memory 5000, which may be implemented by the HD 204 (FIG. 8). The memory 500 stores various databases, and candidate list frame data.

(Relay Device Management Table)

The memory 5000 includes a relay device management database (DB) 5001, which stores therein a relay device management table of FIG. 11. The relay device management table of FIG. 11 stores, for each relay device ID of the relay device 30, the operation state of the relay device 30, the received date and time at which the management system 50 receives the operation state information indicating the operation state of the relay device 30 from the relay device 30, the IP address of the relay device 30, and the maximum data transmission speed of the relay device 30 in Mbps. For example, for the relay device 30a having the relay terminal ID "111a", the relay device management table of FIG. 11 indicates that the operation state is "ON LINE", the received date and time at which the management system 50 receives the operation state information is "13:00 PM of Nov. 10, 2011", the IP address of the relay device 30a is "1.2.1.2", and the maximum data transmission speed of the relay terminal 30a is 100 Mbps.

(Terminal Information Management Table)

The memory 5000 further includes a terminal information management database (DB) 5002, which stores a terminal information management table of FIG. 12. The terminal information management table of FIG. 12 stores a plurality of terminal IDs respectively assigned to the terminals 10 that are managed by the management system 50, in association with a plurality of passwords that are previously determined for the respective terminals 10. The terminal information management table of FIG. 12 further stores a model number of the terminal 10, a serial number of the terminal 10, and a communications protocol of the terminal 10, for each one of the terminals 10. The terminal information management table of FIG. 12 further stores an IP address for the non-dedicated terminal 10D. For example, referring to the terminal information management table of FIG. 12, the terminal 10*da* having the terminal ID "01da" is assigned with the password "dada", and has the model number "8001", the serial number "1001", the communications protocol "non-dedicated 1", and the IP address "1.3.2.3". While the IP address of the non-dedicated terminal 10D is managed using the terminal information management table of FIG. 12 as static data, the IP address of the dedicated terminal 10A is managed using a terminal state management table of FIG. 13 as dynamic data. The dedicated terminal 10A is capable of changing its IP address, which may be convenient.

In this example, the communications protocol "dedicated" indicates that the terminal 10 uses the communications protocol used by the dedicated terminal 10A as described above referring to FIGS. 2 and 4. The communications protocol "non-dedicated 1" indicates that the terminal 10 uses the communications protocol used by the non-dedicated terminal 10D as described above referring to FIG. 4. The communications protocol "non-dedicated 2" indicates that the terminal 10 uses a communications protocol, which differs from the communications protocol used by the dedicated terminal 10A and the communications protocol used by the non-dedicated terminal 10D. In other words, the non-dedicated terminal 10D may not only be limited to one type of communication terminal 10.

(Terminal State Management Table)

The memory 5000 further includes a terminal state management database (DB) 5003, which stores the terminal state management table of FIG. 13. The terminal state management table of FIG. 13 stores, for each one of the terminal IDs assigned to the terminals 10, the terminal name to be used for communication with the terminal 10, the terminal name of the terminal 10, the operation state of the terminal 10, the received date and time at which the management system 50 receives the login request information from the terminal 10, and the IP address of the terminal 10. For example, for the terminal 10*aa* having the terminal ID "01aa", the terminal state management table of FIG. 13 indicates that the terminal name is "Japan Tokyo Office AA terminal", the operation state is online ("ONLINE") and is available for communication ("COMMUNICATION OK"), the received date and time is "13:40 PM, Nov. 10, 2011", and the IP address of the terminal 10*aa* is "1.2.1.3".

In this example, the terminal state management table of FIG. 13 only manages information regarding the dedicated terminals 10A such that information regarding any terminal other than the dedicated terminals 10A, such as the IP addresses of the non-dedicated terminals 10D, are not managed using the terminal state management table of FIG. 13.

(Candidate List Management Table)

The memory 5000 further includes a candidate list management database (DB) 5004, which stores a candidate list management table of FIG. 14. The candidate list management table of FIG. 14 stores, for each one of a plurality of request terminals 10 capable of requesting for videoconference communication, the terminal ID of the request terminal 10, and one or more terminal IDs that are respectively assigned to candidate terminals 10 that are previously registered for the request terminal 10. In this example, for the request terminal 10, one or more terminals 10 of the communication system 1 of FIG. 1 are previously registered as the candidate terminal 10. For example, the candidate list management table of FIG. 14 indicates that the request terminal 10*aa* having the terminal ID "01aa" is most likely to request for videoconference with respect to the terminal 10*ab* having the terminal ID "01ab", the terminal 10*ba* having the terminal ID "01ba", and the terminal 10*bb* having the terminal ID "01bb", etc. The management system 50 manages the candidate list management table of FIG. 14, for example, according to a user instruction received from any one of the terminals 10. For example, in response to a user instruction received from the terminal 10*aa*, the management system 50 may add or delete the contents of the candidate list management table of FIG. 14.

As described above, the terminal state management table of FIG. 13 does not store information such as the IP address regarding the terminal 10 other than the dedicated terminal 10A. The candidate list management table of FIG. 14 stores information such as the terminal ID regarding the terminal 10 other than the dedicated terminal 10A. More specifically, the candidate list management table of FIG. 14 stores information regarding the candidate counterpart terminal 10 irrespective of whether the terminal 10 is the dedicated terminal 10A or the non-dedicated terminal 10D.

(Session Management Table)

The memory 5000 further includes a session management database (DB) 5005, which stores a session management table of FIG. 15. The session management table of FIG. 15 stores information regarding each of the sessions that are carried out by at least two terminals 10 of the communication system 1. The information of the session management table of FIG. 15 may be used for the purpose of selecting the relay device 30 that is most suitable for communication between at least two terminals 10. More specifically, for each session, the session management table of FIG. 15 stores a session ID that identifies the session, a relay device ID of the relay device 30 to be used for transmitting or receiving contents data such as image data and sound data, a terminal ID of the request terminal 10, a terminal ID of the counterpart terminal 10, a delay time ms indicating a time period required for receiving contents data at the counterpart terminal 10, and the date and time information indicating the time at which the management system 50 receives delay information from the counterpart terminal 10.

For example, referring to the session management table of FIG. 15, the relay device 30*a* having the relay device ID "111a" is selected to relay image data and sound data between the request terminal 10*aa* having the terminal ID "01aa" and the counterpart terminal 10*ca* having the terminal ID "01ca". Further, the management system 50 receives the delay information from the counterpart terminal 10*ca* at 14:00 PM, Nov. 10, 2011. Based on the delay information, the delay time ms of 200 milliseconds (ms) is obtained. In case of having videoconference between only two terminals 10, the time at which the delay time is received may be determined based on the time when the management system 50 receives the delay information transmitted from the request terminal 10 rather than based on the time when the management system 50 receives the delay information transmitted from the counterpart terminal 10. In case of having videoconference with more than two terminals 10, the delay information transmitted from the counterpart terminal 10 that receives the image data and sound data is used to manage the date and time at which the delay information is received.

(Conversion Management Table)

The memory 5000 further includes a conversion management database (DB) 5006, which stores a conversion management table of FIG. 16. The conversion management table of FIG. 16 stores, for each one of a plurality of terminal IDs each assigned to the non-dedicated terminal 10 (such as the non-dedicated terminal having the non-dedicated 1 or 2 communications protocol), the IP address of the conversion system 80, and the IP address of the non-dedicated terminal 10.

(Quality Management Table)

The memory 5000 further includes a quality management database (DB) 5007, which stores a quality management table of FIG. 17. The quality management table of FIG. 17 stores the delay time ms of image data in association with the quality of image data. More specifically, the quality management table of FIG. 17 indicates that the quality of image data to be processed by the relay device 30 is lowered, as the delay time ms of the image data at the request terminal 10 or the counterpart terminal 10 increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Functional Structure of Management System)

Referring back to FIG. 9, the data transmitter/receiver 51, which may be implemented by the network I/F 209 (FIG. 8) according to an instruction received from the CPU 201, transmits or receives various data or information to or from another terminal, device, or system through the communications network 2.

Under control of the CPU 201 (FIG. 8), the terminal authenticator 52 obtains a terminal ID and a password from the login request information that is received from the data transmitter/receiver 51. Using the terminal ID and the password as a search key, the terminal authenticator 52 searches the terminal information management DB 5002 (FIG. 12) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 8), manages the operation state of the request terminal 10 that sends the login request information using the terminal state management DB 5003 (FIG. 13). More specifically, the state manager 53 stores the terminal ID of the request terminal 10, the operation state of the request terminal 10, the date and time at which the management system 50 receives the login request information from the request terminal 10, and the IP address of the request terminal 10. When the power switch 109 is changed from the "ON" state to the "OFF" state by the user, the state manager 53 receives the operation state information indicating that the power is turned off from the terminal 10, and changes the operation state of the terminal 10 from the "online" state to the "offline" state in the terminal state management table of FIG. 13.

The determiner 55, which operates according to an instruction received from the CPU 201 (FIG. 8), determines whether the communications protocol being used by the counterpart terminal 10 is the predetermined communications protocol being used by the dedicated terminal 10A.

The session manager 56, which operates according to an instruction received from the CPU 201 (FIG. 8), stores the relay device ID of the relay device 30 for relaying contents data, the terminal ID of the request terminal 10, the terminal ID of the counterpart terminal 10, the delay time "ms" indicating delay in time at which the image data is received at the counterpart terminal 10, and the received date and time at which the delay time information transmitted from the counterpart terminal is received at the management system 50, in a corresponding manner, in the session management DB 5005 (FIG. 15) of the memory 5000. The session manager 56 further generates a session ID for identifying a session to be used for establishing the communication session.

The quality determiner 57, which operates according to an instruction received from the CPU 201 (FIG. 8), searches the quality management DB 5007 (FIG. 17) using the delay time ms obtained for the selected relay device 30 to obtain the image data quality that is desirable for communication using the relay device 30. More specifically, the quality determiner 57 determines the image quality of the image data to be relayed by the relay device 30, based on the image quality information of the image data that is extracted by the memory control 59.

The delay time manager 58, which operates according to an instruction received from the CPU 201 (FIG. 8), manages the session management table of FIG. 15 stored in the session management DB 5005 so as to keep updated the value stored in the "delay time" field for the terminal ID of the counterpart terminal 10 that is extracted by the memory control 59.

The memory control 59, which operates according to an instruction received from the CPU 201 (FIG. 8) in cooperation with the HDD 205 (FIG. 8), stores various data in the memory 5000 or read out various data from the memory 5000. For example, the memory control 59 searches the management DB in the memory 5000 using a search key to read out data associated with the search key as a search result.

<Functional Structure of Conversion System>

The conversion system 80 includes a data transmitter/receiver 81, a communications protocol converter 82, and a memory control 89. These units shown in FIG. 9 correspond to a plurality of functions or functional modules, which are executed according to an instruction of the CPU 201 (FIG. 8) that is generated according to the conversion control program being loaded from the HD 204 onto the RAM 203. The conversion system 80 further includes a memory 8000, which may be implemented by the HD 204 (FIG. 8) or the RAM 203. The memory 8000 stores conversion rule data, which is used for converting contents data.

(Functional Structure of Conversion System)

Referring now to FIGS. 8 and 9, a functional structure of the conversion system 80 is explained according to an example embodiment of the present invention.

The data transmitter/receiver 81 of the conversion system 80 of FIG. 9, which may be implemented by an instruction from the CPU 101 (FIG. 8) in cooperation with the network I/F 111 (FIG. 8), transmits or receives various data or information to or from another terminal, apparatus, or system, through the communications network 2. The data transmitter/receiver 81 transmits session start request information, which instructs to start a communication session (the third communication session), to the counterpart terminal having the IP address that is received from the relay device 30. In alternative to using the IP address, any other information indicating the location of the counterpart terminal may be used such as the Uniform Resource Identifier (URI) of the counterpart terminal.

The communications protocol converter 82 converts the contents data transmitted from the request terminal 10 or the contents data transmitted from the counterpart terminal 10 according to the conversion rule data stored in the memory 8000, such that the converted contents data has a communications protocol compatible with the counterpart terminal 10 or the request terminal 10.

The memory control 89, which operates according to an instruction received from the CPU 201 (FIG. 8) in cooperation with the HDD 205 (FIG. 8), stores various data in the memory 8000 or read out various data from the memory 8000.

<Operations of Communication System>

Referring now to FIGS. 6, 9, and 18 to 25, operation of displaying a candidate list before starting communications between two dedicated terminals 10A, performed by the communication system 1, is explained according to an example embodiment of the present invention. In the following examples, it is assumed that the terminal 10aa and the terminal 10ca are both implemented as the dedicated terminals 10A.

Figure 18:
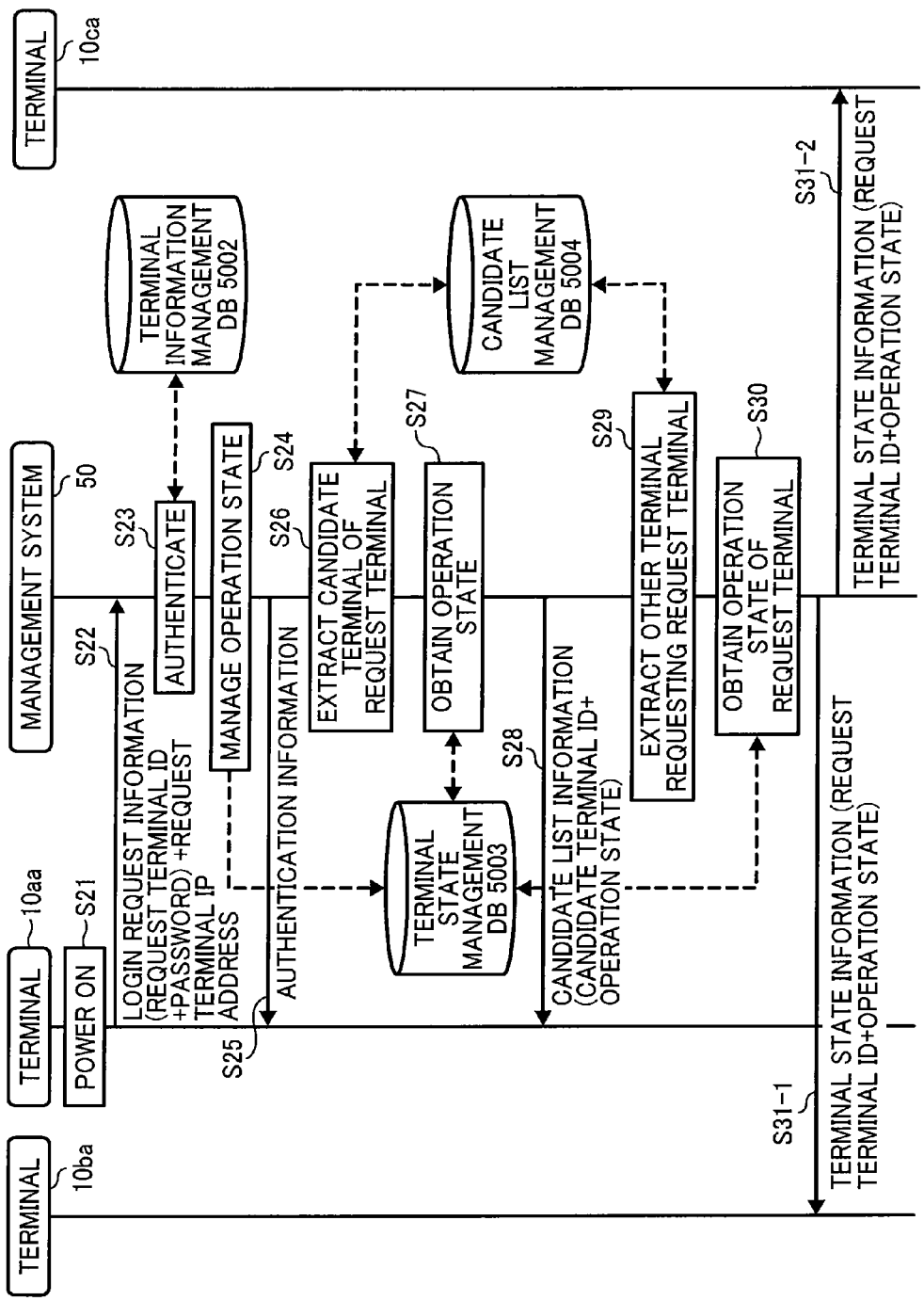
FIG. 18 is a data sequence diagram illustrating operation of establishing communication among two or more terminals of the communication system of FIG. 1, according to an example embodiment of the present invention.

FIG. 18 is a data sequence diagram illustrating operation of processing a request for starting communication with a counterpart terminal, which is generated by a request terminal, according to an example embodiment of the present invention. In FIG. 18, various management data are transmitted or received through the management data communication session "sei" of FIG. 2.

At S21, the user at the request terminal 10aa, which is the dedicated terminal 10A, turns on the power of the request terminal 10aa through the power switch 109 (FIG. 6). The operation input 12 (FIG. 9) of the request terminal 10aa turns on the power of the request terminal 10aa.

At S22, as the power of the request terminal 10aa is turned on, the login request 13 of the request terminal 10aa automatically causes the data transmitter/receiver 11 to send the login request information that requests the login process to the management system 50 through the communications network 2. The login request information includes a terminal ID that identifies the request terminal 10aa, and a password assigned to the request terminal 10aa. The terminal ID and the password may be obtained by the memory control 19 from the memory 1000, and sent to the data transmitter/receiver 11. At the time of sending the login request information from the request terminal 10aa to the management system 50, the request terminal 10aa sends an IP address of the request terminal 10aa such that the management system 50 can obtain the IP address of the request terminal 10aa.

At S23, the terminal authenticator 52 of the management system 50 searches the terminal information management table (FIG. 12) stored in the memory 5000 using the terminal ID and the password of the login request information received through the data transmitter/receiver 51. When it is determined that the terminal ID and the password of the login request information is stored in the terminal information management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID and the terminal name of the terminal 10aa in the terminal state management table (FIG. 13) to create a record of the terminal 10aa. Using the terminal state management table of FIG. 13, which stores the operations state of online, the date and time of "13:40, Nov. 10, 2011", and the terminal IP address of "1.2.1.3" in association with the terminal ID "01aa" and the terminal name "AA Terminal", various information regarding the terminal 10aa can be managed.

At S25, the data transmitter/receiver 51 of the management system 50 sends the authentication result obtained by the terminal authenticator 52 to the request terminal 10aa that has sent the login request information through the communications network 2. As described above, in this example, it is assumed that the terminal authenticator 52 determines that the terminal 10aa is an authenticated terminal.

At S26, the memory control 59 of the management system 50 searches the candidate list management table (FIG. 14) using the terminal ID "01aa" of the request terminal 10aa that has sent the login request information as a search key to extract a terminal ID of a candidate counterpart terminal 10 that is previously registered for the request terminal 10aa. In this example, the terminal IDs "01ab", "01ba", etc. of the terminals 10ab, 10ba, etc., which are associated with the terminal ID "01aa" of the request terminal 10aa are extracted.

At S27, the memory control 59 further searches the terminal state management table (FIG. 13) using the extracted terminal ID of the candidate counterpart terminal to obtain a terminal name of the candidate counterpart terminal 10. In this example, the operation states "offline", "online (interrupted)", etc. of the candidate terminals 10ab, 10ba, etc., are extracted.

At S28, the data transmitter/receiver 51 transmits candidate list information to the request terminal 10aa. The candidate list information includes the terminal ID and the terminal name of the candidate counterpart terminal 10 that are extracted at S27 and S28. The data transmitter/receiver 11 of the terminal 10aa receives the candidate list information. With this candidate list information, the request terminal 10aa is able to know the current operation state of each one of the candidate counterpart terminals 10 capable of communicating with the request terminal 10aa.

At S29, the memory control 59 of the management system 50 searches the candidate list management table (FIG. 14) using the terminal ID "01aa" of the request terminal 10aa that has send the login request information as a search key to extract the terminal ID of the other request terminal that has registered the request terminal 10aa as a candidate counterpart terminal. In this example referring to the candidate list management table of FIG. 14, the terminal IDs "01ba" "01ca" and "01da" are extracted as the request terminals 10.

At S30, the memory control 59 searches the terminal state management table (FIG. 13) using the terminal ID of the request terminal 10aa as a search key to obtain the operation state of the request terminal 10aa that has sent the login request information.

At S31-1 and 31-2, the data transmitter/receiver 51 sends the terminal state information including the terminal ID "01aa" and the operation state "online" of the request terminal 10aa, which is obtained at S30, to the terminal having the terminal ID that is extracted at S29 and the operation state "online". More specifically, in this example, of the terminals 10ba, 10ca, and 10da each having the terminal ID extracted at S29, the terminals 10ba and 10ca having the online state are selected as the terminal to which the terminal state information is transmitted. As illustrated in FIG. 18, at S31-1, the data transmitter/receiver 51 of the management system 50 sends the terminal state information to the terminal 10ba. At S31-2, the data transmitter/receiver 51 of the management system 50 sends the terminal state information to the terminal 10ca.

When sending the terminal state information, the memory control 59 refers to the terminal state management information (FIG. 13) using the terminal IDs "01ba" and "01ca" to obtain the IP addresses of the terminals 10ba and 10ca. With the IP addresses, the management system 50 is able to send the terminal state information including the terminal ID "01aa" and the operation state "online", to the other terminals 10ba and 10ca each capable of communicating with the request terminal 10aa.

Further, in this example, the terminal state management table (FIG. 13) does not manage the operation state of the terminal 10*da* that is the non-dedicated terminal 10D, such that the management system 50 does not send the terminal state information including the terminal ID "01aa" and the operation state "online" of the request terminal 10*aa*. That is, the non-dedicated terminal 10D is not able to obtain the operation state information of the dedicated terminal 10A.

The operation of FIG. 18 is performed at the other terminal 10, as the power is turned on through selecting the power switch 109. When the operation input 12 receives the instruction to turn on the power, S22 to S31-1, 2 are performed.

Figure 19:
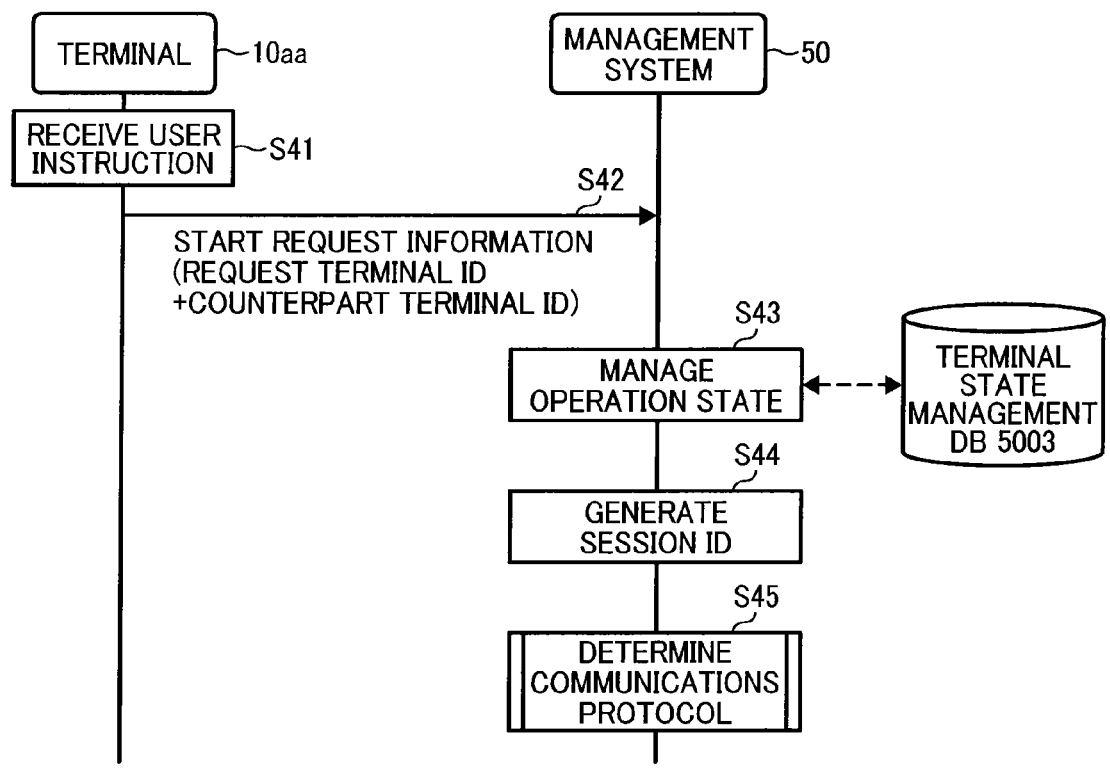
FIG. 19 is a data sequence diagram illustrating operation of processing a request for starting communication between or among the communication terminals of the communication system of FIG. 1.

Referring now to FIGS. 6, 9, and 19 to 22, operation of starting communications between two dedicated terminals 10A, performed by the communication system 1, is explained according to an example embodiment of the present invention. FIG. 19 is a data sequence diagram illustrating operation of processing a request for starting communications with the counterpart terminal 10, performed by the management system 50 in cooperation with the request terminal 10, according to an example embodiment of the present invention.

Referring to FIG. 19, at S41, the user at the request terminal 10*aa* that is the dedicated terminal 10A, operates the operation key 108 (FIG. 6) to select the terminal 10*ca* as a counterpart terminal. Upon selection, the operation input 12 (FIG. 9) of the request terminal 10*aa* receives a user instruction for starting communications with the counterpart terminal 10*ca*.

At S42, the data transmitter/receiver 11 of the request terminal 10*aa* sends the communication start request information that requests the management system 50 to start communication with the counterpart terminal 10*ca* to the management system 50. The communication start request information at least includes the terminal ID "01aa" of the request terminal 10*aa* and the terminal ID "01 ca" of the counterpart terminal 10*ca*.

At S43, the state manager 53 (FIG. 9) of the management system 50 looks for records in the terminal state management DB 5003 (FIG. 13) based on the terminal ID "01aa" of the request terminal 10*aa* and the terminal ID "01ca" of the counterpart terminal 10*ca*, which are included in the communication start request information. The state manager 53 changes each of the operation states of the request terminal 10*aa* and the counterpart terminal 10*ca* in the records, from the "online, communication OK" state to the "online, communicating" state. At this time, the request terminal 10*aa* and the counterpart terminal 10*ca* have not started communication, but the request terminal 10*aa* and the counterpart terminal 10*ca* each have the communicating state. In case another terminal 10 tries to communicate with the request terminal 10*aa* or the counterpart terminal 10*ca*, the management system 50 causes the another terminal 10 to output voice or display indicating that the request terminal 10*aa* or the counterpart terminal 10*ca* is in the communicating state.

At S44, the session manager 56 of the management system 50 generates a session ID for a session that is to be established between the request terminal 10*aa* and the counterpart terminal 10*ca*.

At S45, the management system 50 determines a communications protocol to be used by the counterpart terminal 10*ca*, for example, as described below referring to FIG. 20.

Figure 20:
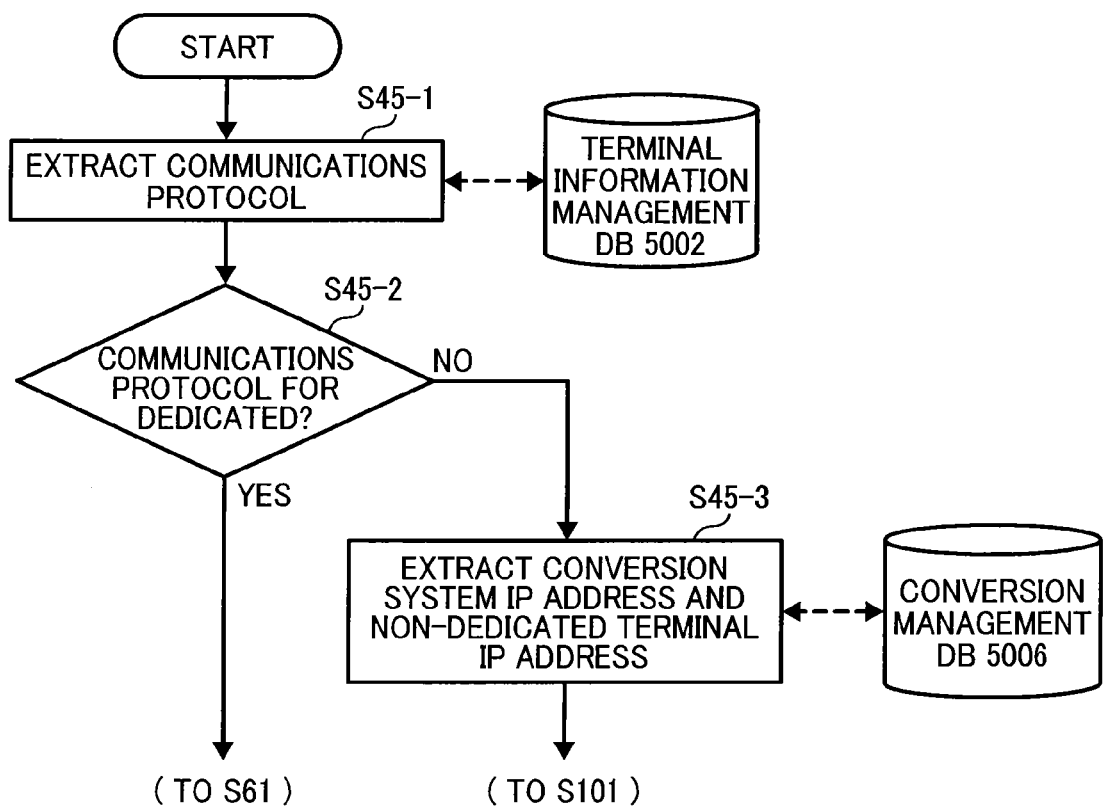
FIG. 20 is a flowchart illustrating operation of determining a communications protocol to be used by the communication terminal of the communication system of FIG. 1.

Referring to FIG. 20, at S45-1, the memory control 59 searches the terminal information management table (FIG. 12) using the terminal ID "01ca" of the counterpart terminal 10*ca*, which is received at the data transmitter/receiver 51, to extract communications protocol information of the counterpart terminal 10*ca*.

At S45-2, the determiner 55 determines whether the communications protocol specified by the extracted communications protocol information is the same as the communications protocol used by the request terminal 10*aa*. More specifically, the determiner 55 determines whether the communications protocol of the counterpart terminal 10*ca* is the communications protocol used by the request terminal 10*aa* that is the dedicated terminal 10A. The determiner 55 determines that the communications protocol is the same when both of the call control protocol and the encoding format are the same. When at least one of the call control protocol and the encoding format is different, the determiner 55 determines that the communications protocol is different between the counterpart terminal 10*ca* and the request terminal 10*aa*.

Figure 21:
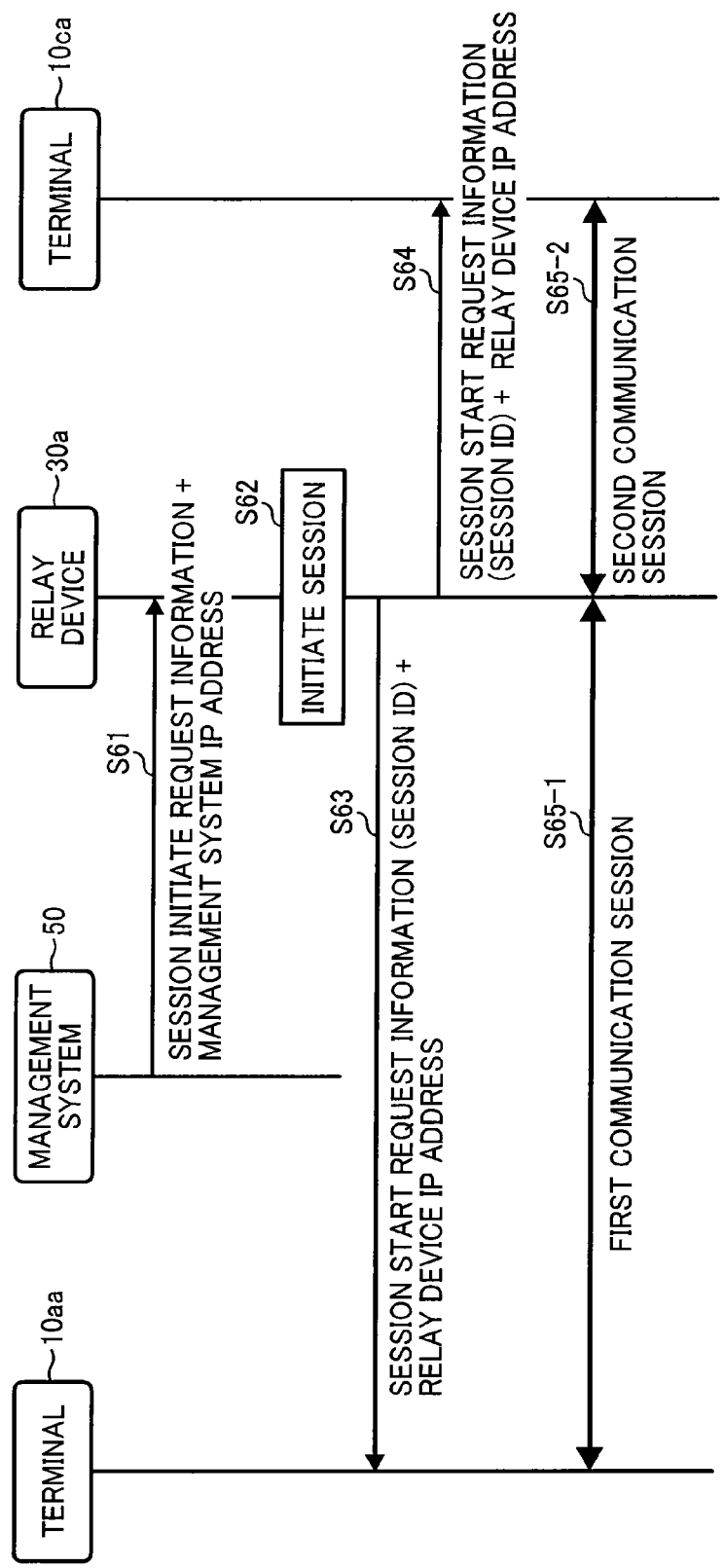
FIG. 21 is a data sequence diagram illustrating operation of establishing a communication session, before starting communication between the communication terminals of the communication system of FIG. 1 when the communications protocol is the same for the communication terminals.

When it is determined that the communications protocol is the same ("YES" at S45-2), the operation proceeds to S61 of FIG. 21. When it is determined that the communications protocol is different ("NO" at S45-2), the operation proceeds to S45-3.

In this example, the counterpart terminal 10*ca* is the dedicated terminal 10A, which communicates using the communications protocol that is the same as the communications protocol of the request terminal 10*aa*. In such case, the operation proceeds to FIG. 21 to establish a communication session between the dedicated communication terminals 10A. Further, in this example illustrated in FIG. 21, the relay device 30*a*, which is connected to the request terminal 10*aa* through the LAN 2*a*, is selected as a relay device to relay contents data between the request terminal 10*aa* and the counterpart terminal 10*ca*.

Referring to FIG. 21, at S61, the data transmitter/receiver 51 of the management system 50 transmits session initiate request information, which requests to initiate a communication session being established by the relay device 30*a*, to the relay device 30*a*. The session initiate request information includes the session ID generated at S44, the IP address of the request terminal 10*aa*, and the IP address of the counterpart terminal 10*ca*. The IP addresses of the terminals 10 are managed by the management system 50 using the terminal state management table of FIG. 13. The management system 50 further transmits the IP address of the management system 50 to the relay device 30*a* together with the session initiate request information. The data transmitter/receiver 31 of the relay device 30*a* receives the session initiate request information and the IP address of the management system 50.

At S62, the data transmitter/receiver 31 of the relay device 30*a* initiates a contents data communication session.

At S63, the data transmitter/receiver 31 of the relay device 30*a* transmits session start request information, which requests to start a communication session, to the request terminal 10*aa*. The session start request information includes the session ID received from the management system 50. The relay device 30*a* further sends the IP address of the relay device 30*a* to the request terminal 10*aa*, with the session start request information. The data transmitter/receiver 11 of the request terminal 10*aa* receives the session start request information and the IP address of the relay device 30*a*.

At S64, the data transmitter/receiver 31 transmits session start request information, which requests to start a communication session, to the counterpart terminal 10*ca*. The session start request information includes the session ID received from the management system 50. The relay device 30*a* further sends the IP address of the relay device 30*a* to the counterpart terminal 10*ca*, with the session start request information. The data transmitter/receiver 11 of the counterpart terminal 10*ca* receives the session start request information and the IP address of the relay device 30*a*.

At S65-1, the request terminal 10aa and the relay device 30a establish a contents data communication session, that is, the first communication session "sed1" of FIG. 2, to transmit or receive contents data.

At S65-2, the counterpart terminal 10ca and the relay device 30a establish a contents data communication session, that is, the second communication session "sed2" of FIG. 2, to transmit or receive contents data.

Figure 22:
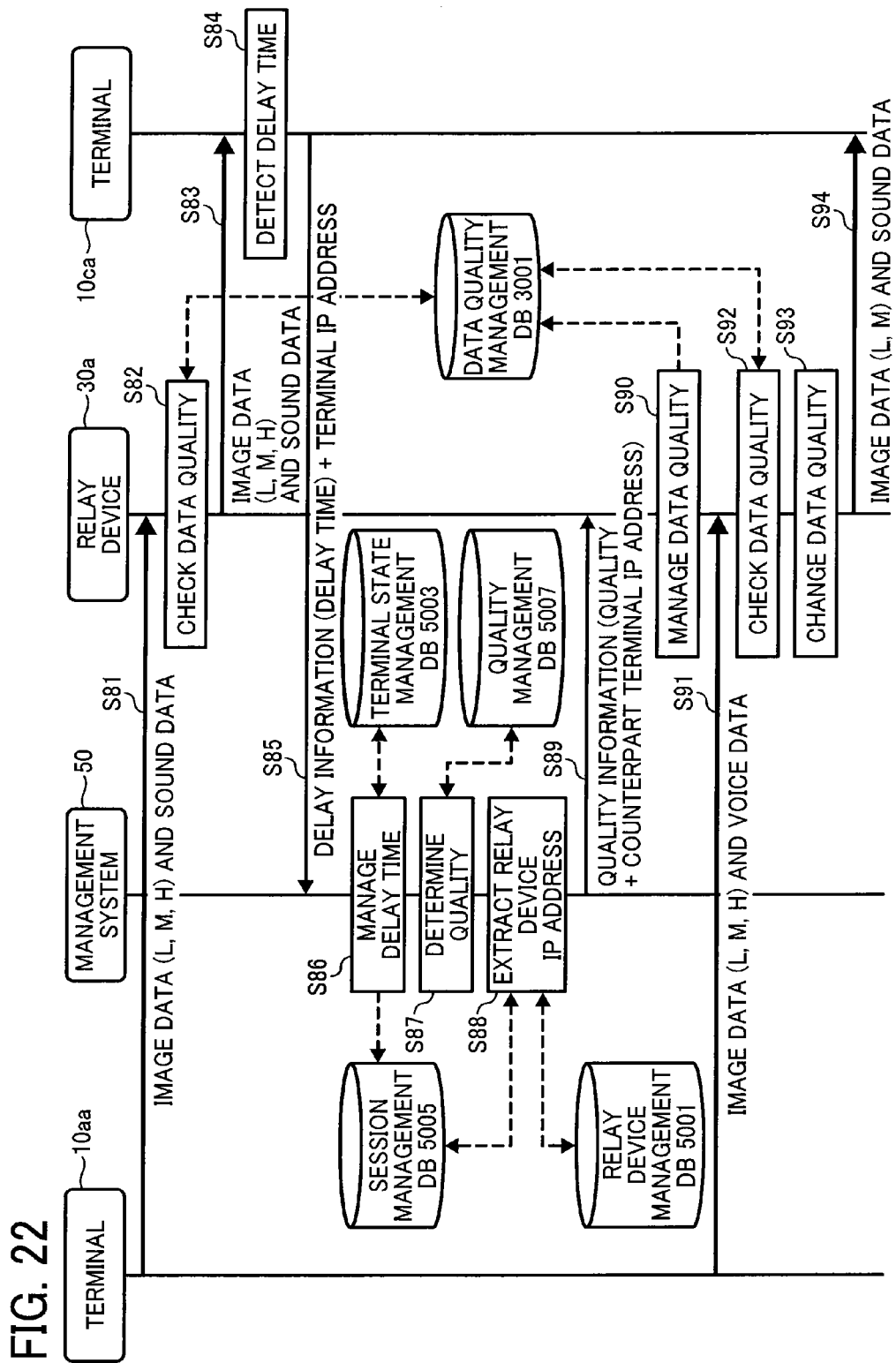
FIG. 22 is a data sequence diagram illustrating operation of transmitting or receiving data between the communication terminals of the communication system of FIG. 1, when the communications protocol is the same for the communication terminals.

Referring now to FIG. 22, operation of transmitting and receiving contents data such as image data and sound data between the request terminal and the counterpart terminal to carry out videoconference, performed by the communication system 1, is explained according to an example embodiment of the present invention. FIG. 22 is a data sequence diagram illustrating operation of transmitting or receiving contents data between the dedicated terminals 10A. In this example, the contents data such as the image data and the sound data flows in a direction from the request terminal 10aa to the counterpart terminal 10ca, or in another direction from the counterpart terminal 10ca to the request terminal 10aa. Since operation such as transmission and reception of the contents data or detection of delay time is the same for both of the directions, the following example focuses on communication in which data flows from the request terminal 10aa to the counterpart terminal 10ca.

Referring to FIG. 22, at S81, the data transmitter/receiver 11 of the request terminal 10aa sends the contents data to the relay device 30a through the communications network 2 in the contents data communications session "sed1". The contents data includes image data such as image data of an object captured by the imaging unit 14 and sound data that is input through the sound input 15a. In this example, it is assumed that the high-quality image data based on the low-level resolution image data, the medium-level resolution image data, and the high-level resolution image data, and the sound data, are transmitted. Accordingly, the data transmitter/receiver 31 of the relay device 30a receives the image data of three different resolution levels, and the sound data.

At S82, the data quality checker 33 searches the data quality management DB 3001 (FIG. 10) using the IP address "1.3.1.3" of the counterpart terminal 10ca as a key to obtain the image quality information, and to determine whether to change quality of image data to be transmitted to the relay device 30a or interrupt transmission of image data.

In this example, the quality of image data to be transmitted to the relay device 30a is the high-quality image data. Since the image data that is received at the data transmitter/receiver 31 has the quality that is the same as the quality of the image data obtained from the data quality management DB 3001, at S83, the relay device 30a sends the high-quality image data and the sound data to the counterpart terminal 10ca in the contents data communication session "sed2", without applying further image processing.

The counterpart terminal 10ca receives the high quality image data that is generated based on the low-level resolution image data, medium-level resolution image data, and high-level resolution image data, and the sound data, at the data transmitter/receiver 11. The display control 16 combines the image data of three different resolution levels into the high quality image data for display onto the display 120ca. Further, the sound output 15b outputs the sound based on the sound data.

At S84, the delay detector 17 of the counterpart terminal 10ca periodically detects a delay time indicating the time at which the image data is received at the data transmitter/receiver 11, for example, every one second. In this example, it is assumed that the delay time of 200 ms is obtained.

At S85, the data transmitter/receiver 11 of the counterpart terminal 10ca sends the delay information indicating the delay time of 200 ms to the management system 50 through the communications network 2, during the management data communication session "sei". With the delay information, the management system 50 is notified of the delay time, and the IP address "1.3.1.3" of the counterpart terminal 10ca that has sent the delay information.

At S86, the delay time manager 58 of the management system 50 searches the terminal state management DB 5003 (FIG. 13) using the IP address "1.3.1.3" of the counterpart terminal 10ca as a search key to extract the terminal ID "01ca" of the counterpart terminal 10ca. The delay time manager 58 stores the delay time of 200 ms obtained from the delay information in a "delay time" field of the record of the terminal ID "01ca" of the session management table stored in the session management DB 5005 (FIG. 15).

At S87, the quality determiner 57 searches the quality management DB 5007 (FIG. 17) using the delay time of 200 ms to extract the image quality information, that is, the image data quality of "MEDIUM". Based on the extracted image data quality, the quality determiner 58 determines that the quality of image data suitable for the delay time of 200 ms is medium.

At S88, the data transmitter/receiver 51 searches the relay device management DB 5001 (FIG. 11) using the relay terminal ID "111a", which is stored in the session management DB (FIG. 15) in association with the counterpart terminal ID "01ca", to extract the IP address "1.2.1.2" of the relay device 30a.

At S89, the data transmitter/receiver 51 sends the image quality information indicating the medium-level image data quality that has been determined at S87, to the relay device 30a through the communications network 2 during the management data communication session "sei". The image quality information is transmitted with the IP address "1.3.1.3" of the counterpart terminal 10ca, which was used as a search key at S86.

At S90, the data quality manager 34 of the relay device 30a stores the IP address "1.3.1.3" of the counterpart terminal 10ca in association with the "medium-level" quality image data to be relayed by the counterpart terminal 10ca, in the data quality management DB 3001 (FIG. 10).

At S91, the request terminal 10aa transmits the high quality image data including the low-level resolution image data, the medium-level resolution image data, and the high-level resolution image data, and the sound data, to the relay device 30a during the contents data communication session "sed1", in a substantially similar manner as described above referring to S81.

At S92, the data quality checker 33 of the relay device 30a searches the data quality management DB 3001 (FIG. 10) using the IP address "1.3.1.3" of the counterpart terminal 10ca as a search key to determine whether to extract the quality of the image data suitable for the counterpart terminal 10ca or to interrupt transmission of image data, in a substantially similar manner as described above referring to S82.

At S93, since the image data quality that is stored for the counterpart terminal 10ca is the medium-level, which is lower than the quality of the image data that is received at the data transmitter/receiver 31, the data quality changer 35 changes the quality of the image data from the high-level to the medium level. In this example, the quality of the sound data remains the same.

At S94, the data transmitter/receiver 31 of the relay device 30a sends the image data having the quality that is lowered to the medium-level, and the sound data, to the counterpart terminal 10*ca* through the communications network 2, during the contents data communication session "sed2". The data transmitter/receiver 11 of the counterpart terminal 10*ca* receives the medium-quality image data that is generated based on the low-level resolution image data and the medium-level resolution image data, and the sound data. The display control 16 of the counterpart terminal 10*ca* combines the image data of two different resolution levels to generate the medium-level image data for display on the display 120*ca*. Further, the sound output 15*b* outputs sounds generated based on the sound data.

As described above, when any delay in receiving the image data at the counterpart terminal 10*ca* is observed, the relay device 30*a* changes the quality of image data by lowering the quality of image data. Accordingly, the users participating the videoconference are able to carry out communication more smoothly. The management system 50 is able to provide the above-described services in controlling quality of image data, when the terminals 10 are dedicated terminals 10A.

Referring now to FIGS. 20, and 23 to 25, operation of transmitting or receiving contents data according to the second communications pattern, in which the dedicated terminal 10A and the non-dedicated terminal 10D communicate with each other, is explained according to an example embodiment of the present invention. In this example, it is assumed that the terminal 10*aa* that is the dedicated terminal 10A communicates with the terminal 10*da* that is the non-dedicated terminal 10D. More specifically, the communications protocol used by the dedicated terminal 10*aa* has a call control protocol that is the (4) IM protocol or the (7) extended IM based protocol, and the encoding format that is SVC. For the communications protocol used by the non-dedicated terminal 10*da*, the call control protocol is (1) session initial protocol (SIP) and the encoding format is AVC.

Before starting communications with the counterpart terminal 10*da*, the request terminal 10*aa* sends the login request information to the management system 50 in a substantially similar manner as described above referring to FIG. 18. In this example, however, the counterpart terminal 10*ca* is selected as one of the candidate counterpart terminals 10. For example, the counterpart terminal 10*ca* may be replaced by the counterpart terminal 10*da*, or the counterpart terminal 10*da* may be additionally included as one of candidate counterpart terminals 10 that may be selected by the request terminal 10*aa*.

Assuming that the user at the request terminal 10*aa* selects the counterpart terminal 10*da* to start communications at S41 of FIG. 19, the request terminal 10*aa* transmits the communication start request information including the terminal ID of the counterpart terminal 10*da* to the management system 50. The management system 50 prepares for a communication session in a substantially similar manner as described above referring to FIG. 19, except that the terminal ID of the counterpart terminal 10*da* is used as a search key. At S45-2 of FIG. 20, the determiner 55 of the management system 50 determines that the communications protocol of the counterpart terminal 10*da* is different from the communications protocol of the request terminal 10*aa* ("NO" at S45-2). In such case, the operation proceeds to S45-3.

At S45-3, the memory control 59 searches the conversion management table (FIG. 16) stored in the conversion management DB 5006 using the terminal ID "01da" of the counterpart terminal 10*da*, which is received at the data transmitter/receiver 51, to extract the IP address "1.3.2.2" of the conversion system 80 and the IP address "1.3.2.3" of the counterpart terminal 10*da*. The operation further proceeds to S101 of FIG. 23.

Figure 23:
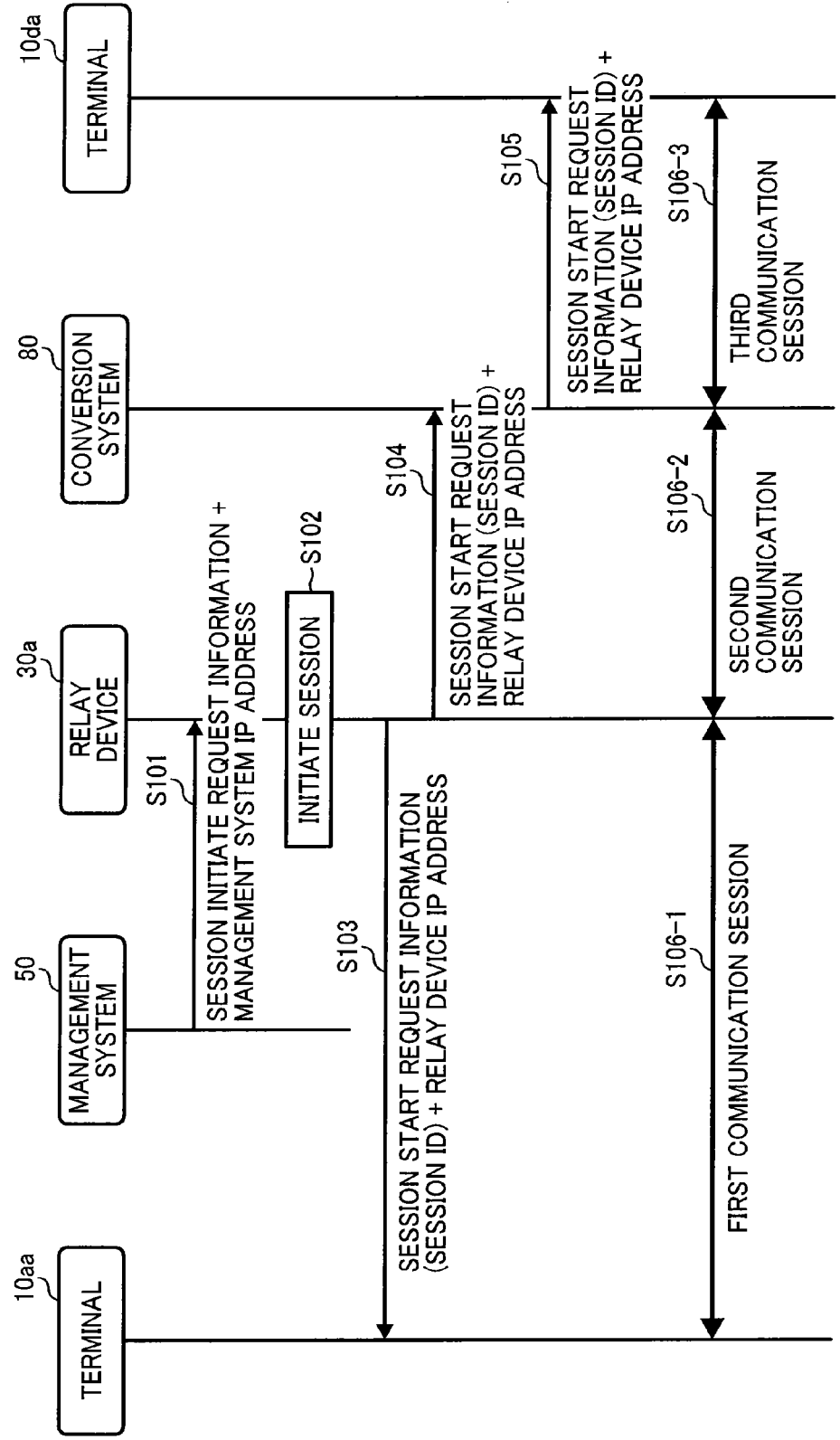
FIG. 23 is a data sequence diagram illustrating operation of establishing a communication session, before starting communication between the communication terminals of the communication system of FIG. 1 when the communications protocol is different between the communication terminals.

FIG. 23 is a data sequence diagram illustrating operation of establishing a contents data communication session between the dedicated terminal 10A and the non-dedicated terminal 10D, according to an example embodiment of the present invention. Further, in this example illustrated in FIG. 23, the relay device 30*a*, which is connected to the request terminal 10*aa* through the LAN 2*a*, is selected as a relay device to relay contents data between the request terminal 10*aa* and the counterpart terminal 10*da*.

At S101, the data transmitter/receiver 51 of the management system 50 transmits session initiate request information, which requests to initiate a contents data communication session, to the relay device 30*a* through the communications network 2. The session initiate request information includes a session ID that is generated at S44, the IP address of the request terminal 10*aa*, the IP address of the conversion system 80, and the IP address of the counterpart terminal 10*da*. The IP address of the request terminal 10*aa* may be obtained from the terminal state management table (FIG. 13). The IP address of the conversion system 80 and the IP address of the counterpart terminal 10*da* are extracted at S45-3.

The management system 50 further sends the IP address of the management system 50 to the relay device 30*a*, with the session initiate request information. The data transmitter/receiver 31 of the relay device 30*a* receives the session initiate request information and the IP address of the management system 50.

At S102, the data transmitter/receiver 31 of the relay device 30*a* initiates a contents data communication session.

At S103, the data transmitter/receiver 31 of the relay device 30*a* transmits session start request information, which requests to start a contents data communication session, to the request terminal 10*aa*. The session start request information includes the session ID received from the management system 50. The relay device 30*a* further sends the IP address of the relay device 30*a* to the request terminal 10*aa*, with the session start request information. The data transmitter/receiver 11 of the request terminal 10*aa* receives the session start request information and the IP address of the relay device 30*a*.

At S104, the data transmitter/receiver 31 of the relay device 30*a* transmits session start request information, which requests to start a contents data communication session, to the conversion system 80. The session start request information includes the session ID and the IP address of the counterpart terminal 10*da*, which are received from the management system 50. The relay device 30*a* further sends the IP address of the relay device 30*a* to the conversion system 80, with the session start request information. The data transmitter/receiver 81 of the conversion system 80 receives the session start request information and the IP address of the relay device 30*a*.

At S105, the data transmitter/receiver 81 of the conversion system 80 transmits session start request information, which requests to start a contents data communication session, to the counterpart terminal 10*da*. The session start request information includes the session ID received from the management system 50. The conversion system 80 further transmits the IP address of the conversion system 80, with the session start request information, to the counterpart terminal 10*da*. The data transmitter/receiver 11 of the counterpart terminal 10*da* receives the session start request information and the IP address of the conversion system 80.

At S106-1, the request terminal 10*aa* and the relay device 30*a* establish a contents data communication session, that is, the first communication session "sed11" of FIG. 4, to transmit or receive contents data.

At S106-2, the relay device 30a and the conversion system 80 establish a contents data communication session, that is, the second communication session "sed12" of FIG. 4, to transmit or receive contents data.

At S106-3, the conversion system 80 and the counterpart terminal 10da establish a contents data communication session, that is, the third communication session "sed13" of FIG. 4, to transmit or receive contents data.

Figure 24:
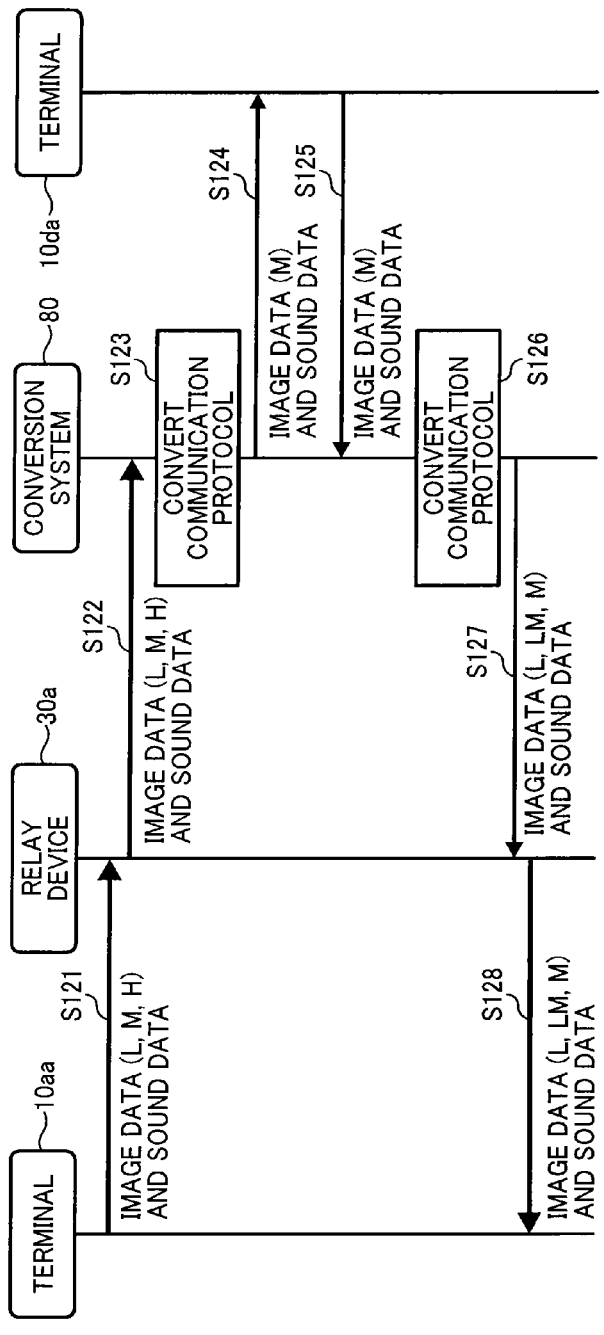
FIG. 24 is a data sequence diagram illustrating operation of transmitting or receiving data between the communication terminals of the communication system of FIG. 1, when the communications protocol is different between the communication terminals.

Referring now to FIG. 24, operation of transmitting and receiving contents data such as image data and sound data between the request terminal and the counterpart terminal to carry out videoconference, performed by the communication system 1, is explained according to an example embodiment of the present invention. In this example illustrated in FIG. 24 contents data is transmitted or received between the dedicated terminal 10A and the non-dedicated terminal 10D.

At S121, the data transmitter/receiver 11 of the request terminal 10aa sends the contents data to the relay device 30a through the communications network 2 in the first communication session "sed11". The contents data includes image data such as image data of an object captured by the imaging unit 14 and sound data that is input through the sound input 15a. In this example, it is assumed that the high-quality image data based on the low-level resolution image data, the medium-level resolution image data, and the high-level resolution image data, and the sound data, are transmitted. Accordingly, the data transmitter/receiver 31 of the relay device 30a receives the image data of three different resolution levels, and the sound data.

At S122, the data transmitter/receiver 31 of the relay device 30a transmits the contents data, which includes the image data of three different resolution levels and the sound data, to the conversion system 80 through the communications network 2, in the second communication session "sed12". Accordingly, the data transmitter/receiver 81 of the conversion system 80 receives the image data of three different resolution levels, and the sound data.

At S123, the communications protocol converter 82 of the conversion system 80 refers to conversion rule data stored in the memory 8000, and converts the image data of three different resolution levels from a communications protocol of the request terminal 10aa to a communications protocol of the counterpart terminal 10da. In this example, the image data of three different resolution levels that are illustrated in FIGS. 3A to 3C is converted to the image data of one resolution level that is illustrated in FIG. 5. As described above referring to FIG. 5, the image data of FIG. 5 has medium-level resolution.

At S124, the data transmitter/receiver 81 of the conversion system 80 transmits the medium-level resolution image data and the sound data to the counterpart terminal 10da, through the communications network 2, in the third communication session "sed13". The data transmitter/receiver 11 of the counterpart terminal 10da receives the medium-level resolution image data and the sound data.

At S125, the data transmitter/receiver 11 of the counterpart terminal 10da transmits the contents data, which includes the medium-level resolution image data and the sound data, to the conversion system 80 through the communications network 2 in the third communication session "sed13". The data transmitter/receiver 81 of the conversion system 80 receives the medium-level resolution image data and the sound data.

At S126, the communications protocol converter 82 of the conversion system 80 refers to the conversion rule data stored in the memory 800, and converts the medium-level resolution image data and the sound data from the communications protocol of the counterpart terminal 10da to the communications protocol of the request terminal 10aa. More specifically, at S126, the communications protocol converter 82 converts the medium-level resolution image data of FIG. 5, to the low-level resolution image data of FIG. 25A, the low-medium-level resolution image data of FIG. 25B, and the medium-level resolution image data of FIG. 25C.

Figure 25C:
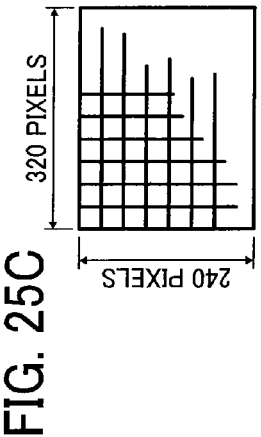
FIGS. 25A to 25C are an illustration for explaining image quality of image data being converted by a conversion system of the communication system of FIG. 1.
Figure 25B:
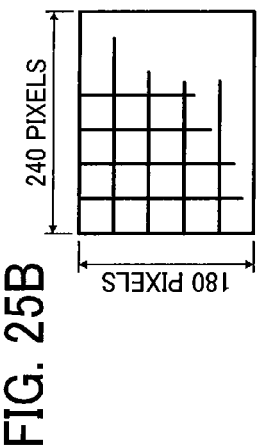
Figure 25A:
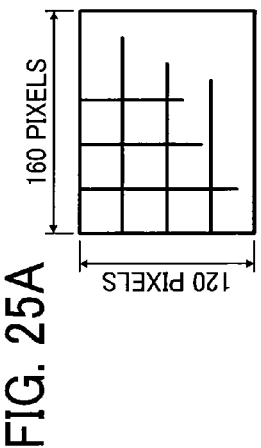

Referring to FIG. 25A, the low-level resolution image data has 160 pixels in the horizontal direction and 120 pixels in the vertical direction. Referring to FIG. 25C, the medium-level resolution image data has 320 pixels in the horizontal direction and 240 pixels in the vertical direction. Referring to FIG. 25B, the low-medium-level resolution image data has 240 pixels in the horizontal direction and 180 pixels in the vertical direction, such that the low-medium resolution image data has a resolution level greater than the resolution of the low-level resolution image data, but lower than the resolution of the medium-level resolution image data.

As the medium-level resolution image data is received from the non-dedicated terminal 10D, the conversion system 80 is not able to generate the high-level resolution image data of FIG. 3C, which is higher in resolution than the medium-level resolution image data. For this reasons, the medium-level resolution image data transmitted from the counterpart terminal 10da is treated as the high-level resolution image data. Based on the high-level resolution image data, image data of three different resolution levels are generated as described above referring to FIGS. 25A to 25C.

At S127, the data transmitter/receiver 81 of the conversion system 80 transmits the image data of three different resolution levels and the sound data to the relay device 30a, through the communications network 2, in the second communication session "sed12". The data transmitter/receiver 31 of the relay device 30a receives the image data of three different resolution levels and the sound data.

At S128, the data transmitter/receiver 31 of the relay device 30a transmits the image data of three different resolution levels and the sound data to the request terminal 10aa, through the communications network 2, in the first communication session "sed11". The data transmitter/receiver 11 of the request terminal 10aa receives the image data of three different resolution levels and the sound data.

Figure 26:
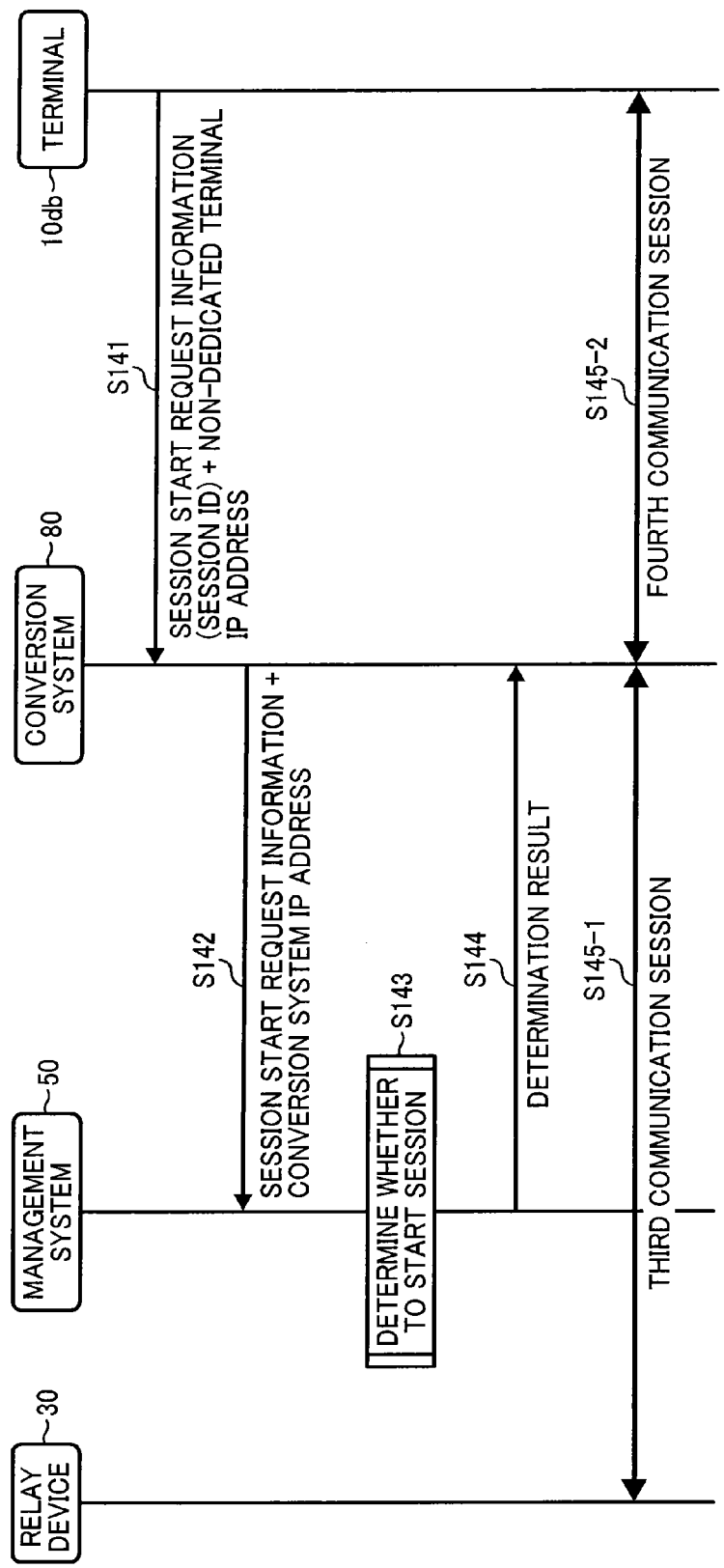
FIG. 26 is a data sequence diagram illustrating operation of processing a request for participating in a session being carried out by the dedicated terminals, generated by the non-dedicated terminal, according to an example embodiment of the present invention.

Referring now to FIGS. 26 and 27, a third communication pattern in which the non-dedicated terminal 10D participates in the communication session established between the dedicated terminals 10A as illustrated in FIG. 21, is explained according to an example embodiment of the present invention. FIG. 26 is a data sequence diagram illustrating operation of processing a participation request that requests to participate in the communication session, generated by the non-dedicated terminal 10D, performed by the communication system 1, according to an example embodiment of the present invention. In this example, the terminal 10db is the non-dedicated terminal that requests for participation, which may be referred to as the participation request terminal 10db. Further, it is assumed that the user at the request terminal 10aa notifies the user at the participation request terminal 10db of the session ID of the communication session currently established as described above referring to FIG. 21, for example, by telephone or email. The session ID of the communication session may be obtained at S63 (FIG. 21). In case the terminal 10aa and the terminal 10da are communicating as illustrated in FIG. 23, the session ID of the communication session may be obtained at S106 (FIG. 23).

As illustrated in FIG. 26, at S141, the data transmitter/receiver 11 of the participation request terminal 10db sends session start request information, which requests to start a communication session, to the conversion system 80. The session start request information includes the session ID ("se01"), which is notified from the user at the request terminal 10*aa*. With the session start request information, the IP address of the participation request terminal 10*db*, that is, the non-dedicated terminal 10D is transmitted. More specifically, the user at the participation request terminal 10*db* enters the session ID "se01" through the operation key 108 of the participation request terminal 10*db*. The data transmitter/receiver 80 of the conversion system 80 receives the session start request information and the IP address of the participation request terminal 10*db*.

At S142, the data transmitter/receiver 81 of the conversion system 80 transmits session start determination request information ("session start request information" in FIG. 26) to the management system 50 through the communications network 2, in the communication session "sei2". The session start determination request information includes the session ID and the IP address of the participation request terminal 10*db*, which are received at S141. With the session start determination request information, the IP address of the conversion system 80 is transmitted. The data transmitter/receiver 51 of the management system 50 receives the session start determination request information and the IP address of the conversion system 80.

At S143, the determiner 55 of the management system 50 determines whether to allow the participation request terminal 10*db* to start a communication session, that is, to participate in the communication session indicated by the session ID.

Referring now to FIG. 27, operation of determining whether to allow starting of a communication session, performed by the determiner 55 of the management system 50, is explained according to an example embodiment of the present invention.

At S143-1, the memory control 59 of the management system 50 searches the session management table (FIG. 15) using the session ID "se01" that is received at S142 as a search key to specify a record associated with the session ID "se01". More specifically, the memory control 59 reads the terminal ID field associated with the session ID "se01".

At S143-2, the determiner 55 determines whether the extracted record for the session ID "se01" includes information regarding the terminal IDs of the request terminal 10 and the counterpart terminal 10. When it is determined that the record for the session ID "se01" includes the terminal IDs ("YES" at S143-2), the operation proceeds to S143-3. At S143-3, the memory control 59 reads out the terminal IDs "01aa" and "01ca" of the terminals 10 associated with the session ID "se01", and further searches the "request terminal ID" field in the candidate list management table (FIG. 14) using the obtained terminal IDs as a search key to obtain the candidate counterpart terminal IDs, respectively, for the terminal ID "01aa" and the terminal ID "01ca".

At S143-4, the memory control 19 searches the terminal information management table (FIG. 12) using the terminal IDs of the candidate counterpart terminals obtained at S143-3 as a search key to obtain the IP addresses of the candidate counterpart terminals.

At S143-5, the determiner 55 determines whether the IP address of the participation request terminal 10 that is the non-dedicated terminal 10D, which is received at S142, is included in the obtained IP addresses of the candidate counterpart terminals.

When the determiner 55 determines that the IP address of the non-dedicated terminal 10D is included ("YES" at S143-5), the operation proceeds to S143-6 to generate a determination result indicating that the communication session is started.

When the determiner 55 determines that the record for the session ID "se01" does not include the session ID at S143-2 ("NO" at S143-2), or when the determiner 55 determines that the IP address of the non-dedicated terminal 10D is not included in the obtained IP addresses of the candidate counterpart terminals ("NO" at S143-5), the operation proceeds to S143-7 to generate a determination result indicating that the communication session is not started.

Referring back to FIG. 26, at S144, the data transmitter/receiver 51 of the management system 50 sends the determination result obtained at S143 to the conversion system 80.

Assuming the determination result indicates to start the communication session, at 145-1, the relay device 30*a* and the conversion system 80 establish a third contents data communication session "sed3" to transmit or receive contents data. At S145-2, the conversion system 80 and the participation request terminal 10*db* that is the non-dedicated terminal 10D establish a fourth contents data communication session "sed4" to transmit or receive contents data.

As described above, in at least one of the above-described example embodiments, when the participation request terminal 10 that is the non-dedicated terminal 10D requests to participate in a communication session that has been carried out by a plurality of communication terminals 10, the management system 50 is able to determine whether to allow the participation request terminal 10 to participate in the session, using the IP address of the participation request terminal 10.

To improve the security, the management system 50 determines whether the user at the participation request terminal 10 that is the non-dedicated terminal 10D is a user, who is known to any one of the users who are participating in the session. The user at the terminal 10 most likely to register the terminal ID of the terminal that such user operates, as a candidate counterpart terminal in the candidate list management table of FIG. 14. As described above, the management system 50 manages the IP address of the non-dedicated terminal 10D using the terminal information management table of FIG. 12. When the IP address of the participation request terminal 10 that is the non-dedicated terminal 10D and the session ID are received from the participation request terminal 10, the management system 50 refers to the session management table of FIG. 16 and the candidate list management table of FIG. 14 to obtain one or more terminal IDs of the candidate counterpart terminals 10 that are previously registered for any one of the request terminal 10 and the counterpart terminal 10 having the session indicated by the received session ID. The management system 50 further refers to the terminal information management table of FIG. 12 to determine whether the IP address of the participation request terminal 10 (non-dedicated terminal) matches any one of the terminal IP addresses of the non-dedicated terminals 10 that are managed by the management system 50.

With this configuration, the management system 50 is able to reject the participation request from the participation request terminal 10, when the participation request terminal 10 is not registered for management by the management system 50, thus improving the security in system. Further, determination of whether to allow the participation request terminal 10 to participate in the session may be made using the IP address of the participation request terminal 10, which can be obtained from the participation request terminal 10 without lowering the security.

In another aspect, the session initiate request information, which is transmitted from the management system 50 to the relay device 30*a*, includes the IP addresses of the request terminal 10, the conversion system 80, and the counterpart terminal 10. The relay device 30*a* sends the session start request information to the request terminal 10 using the IP address of the request terminal 10, and further sends the session start request information including the IP address of the counterpart terminal 10 to the conversion system 80 using the IP address of the conversion system 80. The conversion system 80 sends the session start request information to the counterpart terminal 10 using the IP address of the counterpart terminal 10.

With transmission of the session initiate request information from the management system 50, three contents data sessions are established: a first contents data session "sed11" between the relay device 30 and the request terminal 10; a second contents data session "sed12" between the relay device 30 and the conversion system 80; and a third contents data session "sed13" between the conversion system 80 and the counterpart terminal 10. With this configuration, even when the request terminal 10 and the counterpart terminal 10 use different communications protocols, the terminals 10 are able to communicate with each other through the conversion system 80 that converts the communications protocol.

In the above-described examples, it is assumed that, when the participation request terminal 10 sends the participation request for participating in a session, a first communication terminal 10 and a second communication terminal 10 carry-out communication through the contents data session that has been already established. In the above-described examples, the request terminal 10 or the dedicated terminal 10A is used as one example of the first communication terminal, and the counterpart terminal 10 or the non-dedicated terminal 10D is used as one example of the second communication terminal. Alternatively, the counterpart terminal 10 or the non-dedicated terminal 10D may be used as one example of the first communication terminal, and the request terminal 10 or the dedicated terminal 10A may be used as one example of the second communication terminal.

In the above-described third communication pattern, the participation request terminal 10 requests to participate in the communication session that has been established between the dedicated terminals 10A (the first communication pattern as illustrated in FIG. 21). Alternatively, the participation request terminal 10 may request to participate in the communication session that has been established between the dedicated terminal 10A and the non-dedicated terminal 10D (the second communication pattern as illustrated in FIG. 23).

More specifically, it is assumed that the participation request terminal 10 communicates using the communications protocol that is different from the communications protocol used by at least one of the first and second communication terminals 10 that communicate through the session.

Further, a number of communication terminals 10 that has already established the session is not limited to two, but could be more than two.

Further, the contents data described above is one example of data, or a signal, that may be transmitted or received through a communications network. The data to be transmitted or received may include text data or image file data, which may be transmitted or received together with the contents data including image data and/or sound data. In such case, the communication terminal 10 may be implemented by an information processing apparatus that transmits or receives data such as the text or image file data. The management system 50 may be implemented by a file management system capable of managing data such as the text or image file data. The communication system 1 may manage data such as the text or image file data, in addition to the contents data including image data and/or sound data.

In the above-described example embodiments, the management system 50 manages information regarding the communications protocol using the terminal information management table (FIG. 12). Alternatively, the request terminal 10 may manage the communications protocol information regarding the counterpart terminals 10 including the non-dedicated terminals 10D.

In such case, at S42 of FIG. 19, the request terminal 10 may send the communications protocol information of the counterpart terminal 10 to the management system 50, in addition to the terminal ID of the request terminal 10 and the terminal ID of the counterpart terminal 10 as the start request information.

In one example, at S41 of FIG. 19, the display control 16 may cause the display 120 to additionally display a selection screen that asks the user whether to select the non-dedicated terminal 10D as the counterpart terminal to start communication, for example, by indicating that the candidate counterpart terminal 10 is the non-dedicated terminal 10 when the non-dedicated terminal 10 is selected. In another example, the display control 16 may cause the display 120 to additionally display information indicating that the candidate counterpart terminal 10 is the non-dedicated terminal, when the candidate counterpart terminal 10 is listed as a part of the candidate list.

When the non-dedicated terminal 10 is selected, at S42 of FIG. 19, the request terminal 10aa sends information indicating that the counterpart terminal 10 is the non-dedicated terminal 10D, such as the communications protocol information, to the management system 50 in addition to the terminal IDs of the request and counterpart terminals. In such case, the management system 50 does not perform S45-1 of FIG. 20. More specifically, at S45-2, the management system 50 determines that the counterpart terminal 10 is the non-dedicated terminal 10 based on the communications protocol information included in the start request information ("NO" at S45-3), and the operation proceeds to S45-3 of FIG. 20.

In another example, in alternative to requesting the user to select the counterpart terminal through the selection screen, the request terminal 10 may receive a user input regarding the counterpart terminal 10 in various other ways. For example, when the user knows the location information of the counterpart terminal 10, the operation input 12 may receive a user input that inputs the location information of the counterpart terminal 10, such as the IP address of the counterpart terminal 10. In such case, at S42 of FIG. 19, the request terminal 10 sends the location information of the counterpart terminal 10 (such as the IP address) and the communications protocol information indicating that the counterpart terminal 10 is the non-dedicated terminal, to the management system 50 as information regarding the counterpart terminal to be included in the start request information. At S45-2, the determiner 55 of the management system 50 determines that the counterpart terminal 10 is not the dedicated terminal 10, and the operation proceeds to S45-3. At S45-3, the memory control 59 obtains the location information of the conversion system 80, using the location information of the non-dedicated terminal 10 that is received from the request terminal 10, and the operation proceeds to S101.

In the above-described example embodiments, the relay device 30, the management system 50, the conversion system 80, the program providing system 90, and the maintenance system 100 may each be implemented by a single computer. Alternatively, any number of parts, functions, or modules of the relay device 30, the management system 50, the conversion system 80, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

Further, the illustrated elements of the communication management system 50 and the conversion system 80 can be combined into a single server apparatus, or divided between a plurality of machines in combinations other than that shown for example in FIG. 1.

Further, the terminal ID of the request terminal 10 may be previously stored in a memory of the terminal 10 before shipping, or may be stored in the memory of the terminal 10 through the user input after shipping.

In the above-described example embodiments, the communications protocol for the dedicated terminal 10A is (4) IM protocol or the (7) extended IM based protocol, and the communications protocol for the non-dedicated terminal 10D is (1) session initial protocol (SIP). Alternatively, any desired combination of communications protocol and encoding format may be possible, as long as the communications protocol differs between the dedicated and non-dedicated terminals. For example, the communications protocol for the dedicated terminal 10A may be (4) IM protocol or the (7) extended IM based protocol, and the communications protocol for the non-dedicated terminal 10D may be H.323. In another example, the communications protocol for the dedicated terminal 10A may be (4) IM protocol and the communications protocol for the non-dedicated terminal 10D may be the (7) extended IM based protocol.

A recording medium storing any one of the terminal control program, relay control program, conversion control program, and communication management program, or a storage device such as the HDD 204 that stores any one of the terminal control program, relay control program, conversion control program, and communication management program, or the program providing system 90 provided with the HD 204 storing any one of the terminal control program, relay control program, conversion control program, and communication management program, may be distributed within the country or to another country as a computer program product.

In the above-described examples, the quality of image data to be processed by the relay device 30, which is determined based on information obtainable from any one of the data quality management table of FIG. 10 and the quality management table of FIG. 17, is analyzed in terms of image resolution. Alternatively, any other criteria may be used to analyze quality of image data including, for example, depth of image, sampling frequency in case of sound data, and bit length in case of sound data. Further, the sound data may be transmitted or received in three items of sound data including high-resolution sound data, medium-resolution sound data, and low-resolution sound data.

Further, the date and time information stored in the relay device management table of FIG. 11 or the terminal state management table of FIG. 13, or the delay information stored in the session management table of FIG. 15, is expressed in terms of date and time. Alternatively, the date and time information or the delay information may be expressed only in terms of time such as the time at which information is received.

Further, in the above-described examples, the relay device IP address of the relay device 30 and the terminal IP address of the terminal 10 are respectively managed using the relay device management table of FIG. 11 and the terminal state management table of FIG. 13. Alternatively, location information for identifying a location of the relay device 30 and/or the terminal 10 on the network may each be managed in various other ways. The other examples of location information include, but not limited to, Fully Qualified Domain Name (FQDN). In such case, the communication system 1 is provided with a domain name system (DNS) server that obtains the IP address that corresponds to the FQDN of the relay device 30 or the terminal 10.

In the above-described examples, the communication system 1 of FIG. 1 is treated as a videoconference system. Alternatively, the communication system 1 of FIG. 1 may be implemented as a teleconference system such as the IP teleconference system or the Internet teleconference system. Alternatively, the communication system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the communication system 1 of FIG. 1 may be implemented as a communication system having a portable phone. In such case, the terminal 10 is implemented as the portable phone.

In the above-described examples, the contents data is assumed to include image data and sound data. Alternatively, the contents data may include any other type of data that affects human senses of sight in alternative to image data, or any other type of data that affects human senses of hearing in alternative to sound data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communications network 2. In case the contents data that affects human senses of smell, the terminal 10 may convey the contents data that affects senses of smell felt by a user at the terminal 10 to another terminal 10 through the communications network 2. In case the contents data that affects human senses of taste, the terminal 10 may convey the contents data that affects senses of taste felt by a user at the terminal 10 to another terminal 10 through the communications network 2.

Further, the contents data may only include one type of contents data selected from sight data such as image data, hearing data such as sound data, touch data, smell data, and taste data.

Further, in the above-described examples, the communication system 1 is implemented as a videoconference system for use at offices. Other examples of use of the communication system 1 include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in a communication management system that manages a plurality of communication terminals. The communication management system includes: a candidate counterpart terminal manager to store, for each one of a plurality of communication terminals, terminal identification information for identifying the communication terminal, and candidate counterpart terminal identification information for identifying one or more candidate counterpart communication terminals that may be requested to start communication with the communication terminal, in association with each other; a terminal information manager to store, for each one of the plurality of communication terminals, the terminal identification information of the communication terminal, and location information indicating a location of the communication terminal on a network, in association with each other; a session manager to store session identification information for identifying a communication session carried by at least a first communication terminal and a second communication terminal of the plurality of communication terminals, and terminal identification information of at least the first and second communication terminals carrying the communication session, in association with each other; a receiver to receive a session start determination request that requests to determine whether to start a communication session with a third communication terminal from a conversion system, the conversion system capable of converting a communications protocol of contents data to be transmitted or received through at least two of the plurality of communication terminals, the session start determination request including 1) location information of the third communication terminal that requests to participate in the communication session being carried by the first and second communication terminals, and 2) session identification information for identifying the communication session being carried by the first and second communication terminals; an obtainer to obtain the terminal identification information of at least the first and second communication terminals stored in association with the session identification information received at the receiver, obtain candidate counterpart terminal identification information of one or more candidate counterpart communication terminals associated with the obtained terminal identification information of at least the first and second communication terminals, and obtain location information of the one or more candidate counterpart communication terminals associated with the obtained candidate counterpart terminal information; a determiner to determine whether the location information of the third communication terminal received at the receiver matches any one of the obtained location information of the one or more candidate counterpart communication terminals for at least the first and second communication terminals carrying the communication session identified by the session identification information received at the receiver; and a transmitter to transmit a response indicating to start a communication session with the third communication terminal based on a determination result indicating that the location information of the third communication terminal matches one of the obtained location information, to the conversion system in response to the session start determination request.

In one example, the candidate counterpart terminal manager corresponds to the candidate list management DB 5004, which may be implemented by a memory that operates in cooperation with a processor. The terminal information manager corresponds to the terminal information management DB 5002, which may be implemented by a memory that operates in cooperation with a processor. The session manager corresponds to the session management DB 5005, which may be implemented by a memory that operates in cooperation with a processor. The processor may be the CPU 201 (FIG. 8). The receiver corresponds to the data transmitter/receiver 51, which may be implemented by the network I/F 209 (FIG. 8) according to an instruction received from the CPU 201. The obtainer corresponds to the memory control 59, which may be implemented by an instruction received from the CPU 201 (FIG. 8) in cooperation with the HDD 205 (FIG. 8). The determiner corresponds to the determiner 55, which may be implemented by the CPU 201 (FIG. 8). The transmitter corresponds to the data transmitter/receiver 51.

In one example, the third communication terminal may be the non-dedicated terminal 10D, which communicates using a communications protocol different that the communications protocol of the dedicated terminal 10A.

What is claimed is:

1. A communication management system, comprising:

a memory configured to store, for each one of a plurality of communication terminals including at least a first communication terminal of a first type that uses a first communication protocol and a second communication terminal of a second type that uses a second communication protocol, terminal identification information for identifying the respective communication terminal, and candidate counterpart terminal identification information for identifying one or more candidate counterpart communication terminals that may be requested to start communication with the respective communication terminal, in association with each other;

the memory being further configured to store, for the second communication terminal that uses the second communication protocol among the plurality of communication terminals, the terminal identification information of the second communication terminal, and address information indicating an address of the second communication terminal that uses the second communication protocol on a network, in association with each other;

the memory being further configured to store session identification information for identifying a communication session, the communication session being carried by at least the first communication terminal that uses the first communication protocol and the second communication terminal that uses the second communication protocol of the plurality of communication terminals, and terminal identification information of at least the first and second communication terminals carrying the communication session, in association with each other;

a receiver configured to receive a session start determination request that requests to determine whether to start a communication session with a third communication terminal that uses the second communication protocol from a conversion system, the conversion system including circuitry configured to convert between the first communication protocol and the second communication terminal in relaying content data to be transmitted or received through at least two of the plurality of communication terminals, the session start determination request including 1) address information of the third communication terminal that requests to participate in the communication session being carried by the first and second communication terminals, and 2) session identification information for identifying the communication session being carried by the first and second communication terminals;

circuitry configured to obtain the terminal identification information of at least the first and second communication terminals stored in association with the session identification information received at the receiver, obtain candidate counterpart terminal identification information of one or more candidate counterpart communication terminals associated with the obtained terminal identification information of at least the first and second communication terminals from the memory, and obtain address information of the one or more candidate counterpart communication terminals that uses the second communication protocol associated with the obtained candidate counterpart terminal information from the memory;

determine whether the address information of the third communication terminal received at the receiver matches any one of the obtained address information of any one of the one or more candidate counterpart communication terminals using the second communication protocol for at least the first and second communication terminals carrying the communication session identified by the session identification information received at the receiver; and a transmitter configured to transmit a response indicating to start a communication session with the third communication terminal based on a determination result indicating that the address information of the third communication terminal matches one of the obtained address information, to the conversion system in response to the session start determination request.

2. The communication management system of claim 1, wherein the first and second communications protocol are each defined by a call control protocol used for connecting or disconnecting connections with a counterpart communication terminal, and an encoding format used for encoding contents data to an IP packet, and at least one of the call control protocol and the encoding format differs between the first and second communication protocol.

3. The communication management system of claim 1, wherein the address information includes an IP address.

4. A communication system, comprising: the communication management system of claim 1; and the conversion system configured to start a communication session with the third communication terminal to transmit or receive contents data using the second communication protocol.

5. The communication system of claim 4, wherein the conversion system converts the communications protocol of the contents data between the third communication terminal and the first communication terminal that communicates using the first communication protocol.

6. A communication method, comprising:

storing, in a memory, for each one of a plurality of communication terminals including at least a first communication terminal of a first type that uses a first communication protocol and a second communication terminal of a second type that uses a second communication protocol, terminal identification information for identifying the respective communication terminal and candidate counterpart terminal identification information for identifying one or more candidate counterpart communication terminals that may be requested to start communication with the respective communication terminal, in association with each other;

storing, in the memory, for the second communication terminal that uses the second communication protocol among the plurality of communication terminals, the terminal identification information of the second communication terminal, and address information indicating an address of the second communication terminal that uses the second communication protocol on a network, in association with each other;

storing, in the memory, session identification information for identifying a communication session, the communication session being carried by at least the first communication terminal that uses the first communication protocol and the second communication terminal that uses the second communication protocol of the plurality of communication terminals, and terminal identification information of at least the first and second communication terminals carrying the communication session, in association with each other;

receiving a session start determination request that requests to determine whether to start a communication session with a third communication terminal that uses the second communication protocol from a conversion system, the conversion system including circuitry configured to convert between the first communication protocol and the second communication terminal in relaying content data to be transmitted or received through at least two of the plurality of communication terminals, the session start determination request including 1) address information of the third communication terminal that requests to participate in the communication session being carried by the first and second communication terminals, and 2) session identification information for identifying the communication session being carried by the first and second communication terminals;

obtaining the terminal identification information of at least the first and second communication terminals stored in association with the session identification information received at the receiver, obtain candidate counterpart terminal identification information of one or more candidate counterpart communication terminals associated with the obtained terminal identification information of at least the first and second communication terminals from the memory, and obtain address information of the one or more candidate counterpart communication terminals that uses the second communication protocol associated with the obtained candidate counterpart terminal information from the memory;

determining whether the address information of the third communication terminal received at the receiver matches any one of the obtained address information of any one of the one or more candidate counterpart communication terminals using the second communication protocol for at least the first and second communication terminals carrying the communication session identified by the session identification information received at the receiver; and transmitting a response indicating to start a communication session with the third communication terminal based on a determination result indicating that the address information of the third communication terminal matches one of the obtained address information, to the conversion system in response to the session start determination request.

7. The communication method of claim 6, wherein the first and second communications protocol are each defined by a call control protocol used for connecting or disconnecting connections with a counterpart communication terminal, and an encoding format used for encoding contents data to an IP packet, and at least one of the call control protocol and the encoding format differs the first and second communication protocol.

8. A non-transitory recording medium storing a plurality of instructions which, when executed by a communication management system, cause the communication management system to perform a communication method comprising:

storing, in a memory, for each one of a plurality of communication terminals including at least a first communication terminal of a first type that uses a first communication protocol and a second communication terminal of a second type that uses a second communication protocol, terminal identification information for identifying the respective communication terminal, and candidate counterpart terminal identification information for identifying one or more candidate counterpart communication terminals that may be requested to start communication with the respective communication terminal, in association with each other;

storing, in the memory, for the second communication terminal that uses the second communication protocol among the plurality of communication terminals, the terminal identification information of the second communication terminal, and address information indicating an address of the second communication terminal that uses the second communication protocol on a network, in association with each other;

storing, in the memory, session identification information for identifying a communication session, the communication session being carried by at least the first communication terminal that uses the first communication protocol and the second communication terminal that uses the second communication protocol of the plurality of communication terminals, and terminal identification information of at least the first and second communication terminals carrying the communication session, in association with each other;

receiving a session start determination request that requests to determine whether to start a communication session with a third communication terminal that uses the second communication protocol from a conversion system, the conversion system including circuitry configured to convert between the first communication protocol and the second communication terminal in relaying content data to be transmitted or received through at least two of the plurality of communication terminals, the session start determination request including 1) address information of the third communication terminal that requests to participate in the communication session being carried by the first and second communication terminals, and 2) session identification information for identifying the communication session being carried by the first and second communication terminals;

obtaining the terminal identification information of at least the first and second communication terminals stored in association with the session identification information received at the receiver, obtain candidate counterpart terminal identification information of one or more candidate counterpart communication terminals associated with the obtained terminal identification information of at least the first and second communication terminals from the memory, and obtain address information of the one or more candidate counterpart communication terminals that uses the second communication protocol associated with the obtained candidate counterpart terminal information from the memory;

determining whether the address information of the third communication terminal received at the receiver matches any one of the obtained address information of any one of the one or more candidate counterpart communication terminals using the second communication protocol for at least the first and second communication terminals carrying the communication session identified by the session identification information received at the receiver; and transmitting a response indicating to start a communication session with the third communication terminal based on a determination result indicating that the address information of the third communication terminal matches one of the obtained address information, to the conversion system in response to the session start determination request.

\* \* \* \* \*